US010026070B2

United States Patent
Thorpe et al.

(10) Patent No.: US 10,026,070 B2
(45) Date of Patent: Jul. 17, 2018

(54) COST OPTIMIZATION OF CLOUD COMPUTING RESOURCES

(71) Applicant: Solano Labs, Inc., San Francisco, CA (US)

(72) Inventors: Christopher A. Thorpe, Lincoln, MA (US); William Josephson, Greenwich, CT (US); Jay Moorthi, San Francisco, CA (US); Steven R. Willis, Cambridge, MA (US)

(73) Assignee: Solano Labs, Inc., San Francisco, CA (US)

( * ) Notice: Subject to any disclaimer, the term of this patent is extended or adjusted under 35 U.S.C. 154(b) by 0 days.

(21) Appl. No.: 15/140,727

(22) Filed: Apr. 28, 2016

(65) Prior Publication Data

US 2016/0321115 A1    Nov. 3, 2016

Related U.S. Application Data

(60) Provisional application No. 62/153,938, filed on Apr. 28, 2015.

(51) Int. Cl.

| G06F 9/46 | (2006.01) |
| G06Q 20/14 | (2012.01) |
| H04L 12/911 | (2013.01) |

(52) U.S. Cl.
CPC ......... *G06Q 20/145* (2013.01); *H04L 47/823* (2013.01)

(58) Field of Classification Search
None
See application file for complete search history.

(56) References Cited

U.S. PATENT DOCUMENTS

| 6,594,684 B1 | 7/2003 | Hodjat et al. |
| 7,020,797 B2 | 3/2006 | Patil |

(Continued)

FOREIGN PATENT DOCUMENTS

| EP | 2 144 164 A1 | 1/2010 |
| WO | WO 13/185175 A1 | 12/2013 |

OTHER PUBLICATIONS

Lorido-Botran et al, Auto-scaling Techniques for Elastic Applications in Cloud Environments, University of the Basque Country, Sep. 2012, 44 pages.*
Verma et al., Large-scale cluster management at Google with Borg, ACM, Apr. 21-24, 2015, 18 pages.*
International Preliminary Report on Patentability dated Mar. 7, 2013 for corresponding International Application No. PCT/US2011/048977.
International Search Report and Written Opinion dated Jan. 11, 2012 for corresponding International Application No. PCT/US2011/048977.
International Search Report and Written Opinion dated Sep. 16, 2016 for corresponding International Application No. PCT/US2016/029714.
Invitation to Pay Additional Fees dated Jul. 8, 2016 for corresponding International Application No. PCT/US2016/029714.
Fujiwara et al., Applying Double-Sided Combinational Auctions to Resource Allocation in Cloud Computing. 10th IEEE/IPSI International Symposium on Applications and the Internet. Jul. 2010. Abstract Only.

(Continued)

*Primary Examiner* — Diem Cao
(74) *Attorney, Agent, or Firm* — Fitch Even Tabin & Flannery LLP

(57) ABSTRACT

Systems and methods are provided for managing and/or executing cloud compute instances that may be pre-empted by their providers, known in at least one provider as "spot instances". Various aspects manage early termination (i.e., before customer deallocation or compute task completion) of spot instances, enabling improved utilization, and increasing reliability of executing tasks on spot instances. In some embodiments, systems and/or methods are provided for prediction of when spot instance kills are likely to occur. These systems and/or methods can gracefully handle spot kills issued by Providers (e.g., trigger preservation operations), trigger transitions to spot instances at another Provider, trigger increased bidding to preserve current spot instances, and/or trigger a premium payment to allow for execution of preservation operations, among other options. Other embodiments enable customers to directly manage instance kill operations (e.g., a customer or a customer's program selects instances to terminate via a UI or API, etc.).

19 Claims, 12 Drawing Sheets

(56) References Cited

U.S. PATENT DOCUMENTS

| | | |
|---|---|---|
| 7,870,044 B2 | 1/2011 | Robertson |
| 8,166,458 B2 | 4/2012 | Li et al. |
| 8,214,686 B2 | 7/2012 | Ueda |
| 9,015,708 B2* | 4/2015 | Choudhury ......... G06F 9/45558 709/223 |
| 9,239,996 B2 | 1/2016 | Moorthi et al. |
| 2002/0019844 A1 | 2/2002 | Kurowski et al. |
| 2002/0116533 A1 | 8/2002 | Holliman et al. |
| 2005/0005272 A1 | 1/2005 | Moody et al. |
| 2006/0013229 A1 | 1/2006 | Johansson et al. |
| 2006/0167984 A1 | 7/2006 | Fellenstein et al. |
| 2007/0174069 A1 | 7/2007 | Moore et al. |
| 2007/0180451 A1 | 8/2007 | Ryan et al. |
| 2007/0283351 A1 | 12/2007 | Degenaro et al. |
| 2008/0115143 A1 | 5/2008 | Shimizu et al. |
| 2008/0137139 A1 | 6/2008 | Yamada |
| 2009/0007074 A1 | 1/2009 | Campion et al. |
| 2009/0300635 A1* | 12/2009 | Ferris ................. G06F 9/5072 718/104 |
| 2010/0076856 A1 | 3/2010 | Mullins |
| 2010/0125473 A1 | 5/2010 | Tung et al. |
| 2010/0250642 A1 | 9/2010 | Yellin et al. |
| 2010/0251259 A1 | 9/2010 | Howard |
| 2010/0281095 A1 | 11/2010 | Wehner et al. |
| 2011/0093744 A1 | 4/2011 | Martinov |
| 2012/0131591 A1 | 5/2012 | Moorthi et al. |
| 2013/0036278 A1 | 2/2013 | Strzelczak et al. |
| 2013/0152047 A1 | 6/2013 | Moorthi et al. |
| 2013/0212165 A1 | 8/2013 | Vermeulen et al. |
| 2015/0081885 A1* | 3/2015 | Thomas .............. G06F 9/45558 709/224 |
| 2016/0034835 A1* | 2/2016 | Levi ........................ H04L 67/10 705/7.23 |
| 2016/0226955 A1 | 8/2016 | Moorthi et al. |

OTHER PUBLICATIONS

Garg et al., Mandi: a market exchange for trading utility and cloud computing services. J Supercomput. Published online Mar. 11, 2011.

Garg, Meta Scheduling for Market-Oriented Grid and Utility Computing. Department of Computer Science and Software Engineering. The University of Melbourne, Australia. Jun. 2010.

Grozev et al., Inter-Cloud Architectures and Application Brokering: Taxonomy and Survey. Software—Practice and Experience. 2012; 00:1-22. (On IDS as Inter-cloud Utility Oriented Federation of Cloud Computing Environments; 2010, R. Buyya).

Mihailescu et al., Strategy-Proof Dynamic Resource Pricing of Multiple Resource Types on Federated Clouds. Department of Computer Science. National University of Singapore. 2010.

Mofmann et al., A Combinatorial Exchange for Complex Grid Services. Economic Models and Algorithms for Distributed Systems. Autonomic Systems 2010, p. 221-37; Abstract Only.

Quiroz et al., Towards Autonomic Workload Provisioning for Enterprise Grids and Clouds. 10th IEEE/ACM International Conference on Grid Computing. 2009; pp. 50-57.

* cited by examiner

PRICE AND RESOURCE USAGE OBTAINED BY
WEB SCRAPING                                         202

| Region: US East (N. Virginia) | 1 hour | 6 hours |
|---|---|---|
| General Purpose - Current Generation | | |
| m4.large | $0.069 per Hour | $0.088 per Hour |
| m4.xlarge | $0.139 per Hour | $0.176 per Hour |
| m4.2xlarge | $0.277 per Hour | $0.353 per Hour |
| m4.4xlarge | $0.554 per Hour | $0.706 per Hour |
| m4.10xlarge | $1.386 per Hour | $1.764 per Hour |
| m3.medium | $0.037 per Hour | $0.047 per Hour |
| m3.large | $0.073 per Hour | $0.093 per Hour |
| m3.xlarge | $0.146 per Hour | $0.186 per Hour |
| m3.2xlarge | $0.293 per Hour | $0.372 per Hour |

FIG. 2B

PRICE AND RESOURCE AVAILABILITY OBTAINED BY
API

```
aws ec2 describe-spot-price-history --instance-types m1.xlarge --start-time 2014-01-06T07
:08:09 --end-time 2014-01-06T08:09:10
```

Output:

```
{
  "SpotPriceHistory": [
      {
          "Timestamp": "2014-01-66T07:10:55.000Z",
          "ProductDescription": "SUSE Linux",
          "InstanceType": "m1.xlarge",
          "SpotPrice": "0.087000",
          "AvailabilityZone": "us-west-1b"
      },
      {
          "Timestamp": "2014-01-66T07:10:55.000Z",
          "ProductDescription": "SUSE Linux",
          "InstanceType": "m1.xlarge",
          "SpotPrice": "0.087000",
          "AvailabilityZone": "us-west-1c"
      },
      {
          "Timestamp": "2014-01-06T05:42:36.000Z",
          "ProductDescription": "SUSE Linux (Amazon VPC)",
          "InstanceType": "m1.xlarge",
          "SpotPrice": "0.087000",
          "AvailabilityZone": "us-west-1a"
      },
      ...
}
```
— 204

FIG. 2C

COST OPTIMIZATION OF CLOUD COMPUTING RESOURCES

RELATED APPLICATIONS

This application claims priority under 35 U.S.C. § 119(e) to U.S. Provisional Application Ser. No. 62/153,938 entitled "Cost Optimization of Cloud Computing Resources," filed on Apr. 28, 2015, which is incorporated herein by reference in its entirety.

BACKGROUND

Various providers exist that supply time-shared computing, networking, storage, and associated technology resources. These resources are commonly known as "cloud compute" are available from several Providers including, for example, Amazon's "EC2", Microsoft Azure, and Rackspace Cloud. Resources from these Providers can be made available as on-demand resources and often at fixed prices. Alternatively, Providers can supply "spot" or "pre-emptible" instances ("Spot Instances") that can be much less expensive than on-demand resources. One major difference is that on-demand instances are guaranteed until deallocated, where Spot Instances are typically made available only until another customer is willing to pay more for the instance, for example, the prevailing Spot Instance price exceeds a customer's maximum bid. (Some types of Spot Instances offer an initial "safe" period at additional cost.) Thus, Spot Instances are subject to forced deallocation (a "Spot Kill" or "pre-emption") over time.

SUMMARY

According to one aspect, various systems and method are provided to control allocation and execution of spot instances such that the issues associated with Spot Kills are resolved or mitigated. In one embodiment, a method for managing spot instances is provided. The method comprises obtaining, storing, and analyzing historical time series of cloud compute resource ("resource") characteristics, including at least cost and availability, for one or more resource types from one or more cloud compute providers ("providers") by at least one application program interface (API), predicting, by a computer system, one or more resource characteristics over a future time duration for executing a submitted compute task at the one or more providers, monitoring, by at least one API, resource characteristics for the one or more resource types from the one or more providers, updating, by at least one API, predictions for one or more resource characteristics for remaining portions of the future time duration; and making available, by at least one API, the historical time series of resource characteristics and the analysis of these time series, the analysis including the predictions for one or more resource characteristics. According to another embodiment, each of the preceding steps occurs with two or more providers, where the method includes managing allocation and execution of a compute task between two or more providers, handling termination of executing resources (e.g., saving intermediate results, taking snap shots of executing instances, transferring executing instances between providers (e.g., via saved results, increased a customer bid price automatically, presenting termination selections to a user via a UI or API, etc.).

According to one aspect, a method for managing cloud compute resources is provided. The method comprises obtaining, storing, and analyzing historical time series of cloud compute resource ("resource") characteristics, including at least cost and availability, for one or more resource types from one or more cloud compute providers by at least one application program interface (API), predicting, by a computer system, one or more resource characteristics over a future time duration for executing a submitted compute task at the one or more cloud compute providers, monitoring, by at least one API, resource characteristics for the one or more resource types from the one or more cloud compute providers, updating, by at least one API, predictions for one or more resource characteristics for remaining portions of the future time duration, and providing, by at least one API, the historical time series of resource characteristics and analysis of these time series, the analysis including the predictions of the one or more resource characteristics for determining allocation and execution of the compute task at one or more of the cloud compute providers.

Various embodiments of the above method include any one, two, three, four, five, six, seven, eight, or nine following additional elements or refinements: wherein the method further comprises acts of predicting, by a computer system, a likelihood of a spot kill (e.g., termination of an allocated resource) based at least in part on the predicted resource characteristics, and updating, by the computer system, the prediction on the likelihood of the spot kill based on the updated predictions for the resource characteristics from the one or more providers; wherein the method further comprises an act of scheduling or triggering, by the computer system, execution of preservation operations (and/or mitigating an impact (e.g., loss of data, loss of computation time, failure to complete on time) of the spot kill) in response to the likelihood of the spot kill exceeding a threshold value; wherein the method further comprises acts of: monitoring, by the computer system, real-time characteristics of resources running compute tasks; evaluating whether the characteristics are not optimal; scheduling, by the computer system, execution of preservation operations; and proactively terminating resources with suboptimal characteristics once preservation operations have completed; wherein evaluating the characteristics are not optimal includes modeling execution characteristics across a plurality of other cloud compute providers and identifying better performance characteristics at the current cloud compute provider or the plurality of other cloud compute providers; wherein the method further comprises an act of scheduling, by the computer system, execution of recovery operations (e.g. notifying originators of tasks, or restarting tasks at the same or different provider) in response to a task termination being predicted; wherein the method further comprises acts of receiving and storing, by the computer system, one or more intermediate results of submitted compute tasks; and providing, by the computer system, the one or more intermediate results to a restarted task during execution of recovery operations for a task terminated; wherein the act of predicting, by the computer system, availability characteristics for resources over the future time duration for executing the submitted compute task, includes an act of predicting availability characteristics for resources based on historical, projected or inferred cost characteristics associated with the resources; wherein the act of predicting, by the computer system, availability characteristics for resources over the future time duration, includes an act of predicting utilization of available resources based on historical, projected or inferred utilization of the one or more provider's resources; or wherein the method further comprises an act of determining a utilization model based on the projected or inferred utilization to achieve at least one optimization goal: e.g.

maximize revenue, minimize costs, maximize resource utilization, minimize spot kills, minimize time to completion, or minimize power consumption, or some combination of the foregoing.

According to one aspect, a method for managing cloud compute resources is provided. The method comprises obtaining, storing, and analyzing historical time series of cloud compute resource ("resource") characteristics, including at least costs and availability, for one or more resource types from one or more cloud compute providers ("providers") by at least one application program interface (API); predicting, by a computer system, one or more resource characteristics over a future time duration for executing a submitted compute task ("task") on one or more providers; monitoring, by at least one API, resource characteristics for the one or more resource types from the one or more providers; updating, by at least one API, predictions for one or more resource characteristics for remaining portions of the future time duration; making available, by the at least one API, the historical time series of resource characteristics and analysis of these time series, the analysis including predictions for one or more resource characteristics; determining, by the computer system, a duration of a reservation period for spot instances longer that an individual spot instance time unit sufficient to complete the task, based, at least in part, on the prediction of resource characteristics over the future time duration; offering, by a computer system, execution of the task over the duration of the reservation according to a premium associated with the duration longer than the individual spot instance time unit; and accepting, executing, and completing the task on the one or more providers before the reserved period expires regardless of actual availability of associated spot instances or spot kills.

Various embodiments of the above method include any one, two, three, four, five, six, seven, eight, nine, ten, eleven, twelve, thirteen, fourteen, fifteen, sixteen, seventeen, eighteen, nineteen, or twenty following additional elements or refinements: herein the method further comprises acts of predicting, by a computer system, a likelihood of a spot kill (e.g., termination of an allocated resource) based at least in part on the predicted resource characteristics; and updating, by the computer system, the prediction on the likelihood of the spot kill based on the updated predictions for the resource characteristics from the one or more providers; herein the method further comprises an act of scheduling or triggering, by the computer system, execution of preservation operations (and/or mitigating an impact (e.g., loss of data, loss of computation time, failure to complete on time) of the spot kill) in response to the likelihood of the spot kill exceeding a threshold value; wherein the method further comprises acts of: monitoring, by the computer system, real-time characteristics of resources running compute tasks; evaluating whether the characteristics are not optimal; scheduling, by the computer system, execution of preservation operations; and terminating resources with suboptimal characteristics once preservation operations have completed; wherein evaluating the characteristics are not optimal includes modeling execution characteristics across a plurality of other cloud compute providers and identifying better performance characteristics at the current cloud compute provider or the plurality of other cloud compute providers; wherein the method further comprises an act of scheduling, by the computer system, execution of recovery operations (e.g. notifying originators of tasks, or restarting tasks at the same or different provider) in response to a task termination being predicted; wherein the method further comprises receiving and storing, by the computer system, one or more intermediate results of submitted compute tasks; and providing, by the computer system, the one or more intermediate results to a restarted task during execution of recovery operations for a task terminated; wherein the act of predicting, by the computer system, availability characteristics for resources over the future time duration for executing the submitted compute task, includes an act of predicting availability characteristics for resources based on historical, projected or inferred cost characteristics associated with the resources; wherein the act of predicting, by the computer system, availability characteristics for resources over the future time duration, includes an act of predicting utilization of available resources based on historical, projected or inferred utilization of the one or more provider's resources; wherein the method further comprises an act of determining a utilization model based on the projected or inferred utilization to achieve at least one goal of: maximize revenue, minimize costs, maximize resource utilization, minimize spot kills, minimize time to completion, or minimize power consumption, or some combination of the foregoing; wherein the method further comprises acts of storing, by a computer system, characteristics of prior task execution (e.g., computation time, memory utilization, storage input/output, network bandwidth); analyzing, by the computer system, stored characteristics of prior task execution; and predicting, by the computer system, future characteristics of identical or similar tasks; wherein the act of determining, by the computer system, a duration of a reservation period for spot instances longer that an individual spot instance time unit, incorporates the prediction of future characteristics of the submitted compute task based on analysis of characteristics of prior execution of tasks identical or similar to the submitted compute task; wherein the act of accepting, executing, and completing the task on the one or more providers, incorporates the prediction of future characteristics of the submitted compute task, based on analysis of characteristics of prior execution of tasks identical or similar to the submitted compute task, in planning the execution and completion of the task; wherein the method further comprises an act of displaying a management interface for client or API submission of compute tasks, wherein the interface accepts a specified compute task and engages resources of one or more providers, selected from a plurality of providers which can include the host of the management interface, to execute the compute task; wherein a cloud provider acts as a virtual provider who makes resources of one or more providers (which may include itself) available through a unified interface; wherein the method further comprises acts of predicting, by a computer system, a likelihood of a spot kill (e.g., termination of an allocated resource) based at least in part on the predicted resource characteristics; and updating, by the computer system, the prediction on the likelihood of the spot kill based on the updated predictions for the resource characteristics from the one or more providers; wherein the method further comprises an act of scheduling or triggering, by the computer system, execution of preservation operations (and/or mitigating an impact (e.g., loss of data, loss of computation time, failure to complete on time) of the spot kill) in response to the likelihood of the spot kill exceeding a threshold value; wherein the method further comprises acts of: monitoring, by the computer system, real-time characteristics of resources running compute tasks; evaluating whether the characteristics are not optimal; scheduling, by the computer system, execution of preservation operations; and terminating resources with suboptimal characteristics once preservation operations have completed; wherein evaluating the characteristics are not optimal includes modeling execution characteristics across a plurality of other cloud compute providers and identifying better performance characteristics at the current cloud compute provider or the plurality of other cloud compute providers; wherein the method further comprises an act of scheduling, by the computer system, execution of recovery operations (e.g. notifying originators of tasks, or restarting tasks at the same or different provider) in response to a task termination being predicted; or wherein the method further comprises acts of receiving and storing, by the computer system, one or more intermediate results of submitted compute tasks; and providing, by the computer system, the one or more intermediate results to a restarted task during execution of recovery operations for a task terminated.

According to one aspect, a method for managing cloud compute resources is provided. The method comprises displaying, by a cloud provider, execution characteristics associated with a first class of resources, wherein the first class of resources are configured for on-demand request and are reserved for execution until completion of an associated compute task, displaying, by the cloud provider, execution characteristics associated with a second class of resources, wherein the second class of resources are configured such that that the second class of resources can be terminated by the cloud provider at any time; accepting, by the cloud provider, selection of the second class of resources; triggering execution of the compute task utilizing the second class of resources; displaying, by the cloud provider, a modified execution selection provisioned by the second class of resources, wherein the modified execution utilizing the second class of resources is configured to not be terminated until a certain future time, and wherein the modified execution can be provisioned utilizing changing resources of the second class of resources over the course of execution of the compute task; accepting, by the cloud provider, selection of the modified execution; triggering execution of the compute task utilizing the second class of resources; and managing execution on the second class of resources to maintain execution until the certain future time.

According to one embodiment, the second class of resources are purchased at a variable or fixed price, responsive to submitted bids on the resources, and the resources are purchased and allocated whenever the bids meet or exceed the variable or fixed price at the time. According to one embodiment, the method further comprises acts of: accepting, by the cloud provider, selection of the first class of resources; and triggering execution of the compute task utilizing the first class of resources.

According to one aspect, a system for managing cloud compute resources is provided. The system comprises at least one processor operatively connected to a memory, the at least one processor when executing configured to: obtain, store, and analyze historical time series of cloud compute resource ("resource") characteristics, including at least cost and availability, for one or more resource types from one or more cloud compute providers ("providers"); predict one or more resource characteristics over a future time duration for executing a submitted compute task at the one or more cloud compute providers; at least one application program interface (API) configured to: monitor resource characteristics for the one or more resource types from the one or more cloud compute providers; update predictions for one or more resource characteristics for remaining portions of the future time duration; and provide the historical time series of resource characteristics and analysis of the time series, the analysis including the predictions of the one or more resource characteristics for determining allocation and execution of the compute task at one or more of the cloud compute providers.

Various embodiments of the above system include any one, two, three, four, five, six, seven, eight, or nine following additional elements or refinements: wherein the at least one processor is further configured to: predict a likelihood of a spot kill (e.g., termination of an allocated resource) based at least in part on the predicted resource characteristics; and update the prediction on the likelihood of the spot kill based on the updated predictions for the resource characteristics from the one or more providers; wherein the at least one processor is further configured to: schedule or trigger execution of preservation operations (and/or mitigating an impact (e.g., loss of data, loss of computation time, failure to complete on time) of the spot kill) in response to the likelihood of the spot kill exceeding a threshold value; wherein the at least one processor is further configured to: monitor real-time characteristics of resources running compute tasks; evaluate whether the characteristics are not optimal; schedule execution of preservation operations; and terminate resources with suboptimal characteristics once preservation operations have completed; wherein the at least one processor is further configured to: determine the characteristics are not optimal based on modeling execution characteristics across a plurality of other cloud compute providers and identifying better performance characteristics at the current cloud compute provider or the plurality of other cloud compute providers; wherein the at least one processor is further configured to: schedule execution of recovery operations (e.g. notifying originators of tasks, or restarting tasks at the same or different provider) in response to a task termination being predicted; wherein the at least one processor is further configured to: receive and store one or more intermediate results of submitted compute tasks; and provide the one or more intermediate results to a restarted task during execution of recovery operations for a task terminated; wherein the at least one processor is further configured to: predict availability characteristics for resources over the future time duration for executing the submitted compute task based on predicting availability characteristics for resources based on historical, projected or inferred cost characteristics associated with the resources; wherein the at least one processor is further configured to: predict availability characteristics for resources over the future time duration, based on predicted utilization of available resources from on historical, projected or inferred utilization of the one or more provider's resources; wherein the at least one processor is further configured to: determine a utilization model based on the projected or inferred utilization to achieve at least one optimization goal: e.g. maximize revenue, minimize costs, maximize resource utilization, minimize spot kills, minimize time to completion, or minimize power consumption, or some combination of the foregoing;

According to one aspect, a system for managing cloud compute resources is provided. The system comprises at least one processor operatively connected to a memory, the at least one processor when executing configured to: obtain, store, and analyze historical time series of cloud compute resource ("resource") characteristics, including at least costs and availability, for one or more resource types from one or more cloud compute providers ("providers") by at least one application program interface (API); predict one or more resource characteristics over a future time duration for executing a submitted compute task ("task") on one or more providers;

at least one API configured to: monitor resource characteristics for the one or more resource types from the one or more providers; update predictions for one or more resource characteristics for remaining portions of the future time duration; communicate the historical time series of resource characteristics and analysis of these time series, the analysis including predictions for one or more resource characteristics; wherein the at least one processor is further configure to: determine a duration of a reservation period for spot instances longer that an individual spot instance time unit sufficient to complete the task, based, at least in part, on the prediction of resource characteristics over the future time duration; offer execution of the task over the duration of the reservation according to a premium associated with the duration longer than the individual spot instance time unit; and accept, execute, and complete the task on the one or more providers before the reserved period expires regardless of actual availability of associated spot instances or spot kills.

Various embodiments of the above system include any one, two, three, four, five, six, seven, eight, nine, ten, eleven, twelve, thirteen, or fourteen following additional elements or refinements: wherein the at least one processor is further configured to: predict a likelihood of a spot kill (e.g., termination of an allocated resource) based at least in part on the predicted resource characteristics; and update the prediction on the likelihood of the spot kill based on the updated predictions for the resource characteristics from the one or more providers; wherein the at least one processor is further configured to: schedule or trigger execution of preservation operations (and/or mitigating an impact (e.g., loss of data, loss of computation time, failure to complete on time) of the spot kill) in response to the likelihood of the spot kill exceeding a threshold value; wherein the at least one processor is further configured to: monitor real-time characteristics of resources running compute tasks; evaluate whether the characteristics are not optimal; schedule execution of preservation operations; and terminate resources with suboptimal characteristics once preservation operations have completed; wherein the at least one processor is further configured to: evaluate the characteristics as not optimal responsive to modeling execution characteristics across a plurality of other cloud compute providers and identifying better performance characteristics at the current cloud compute provider or the plurality of other cloud compute providers; wherein the at least one processor is further configured to: schedule execution of recovery operations (e.g. notifying originators of tasks, or restarting tasks at the same or different provider) in response to a task termination being predicted; wherein the at least one processor is further configured to: receive and store one or more intermediate results of submitted compute tasks; and provide the one or more intermediate results to a restarted task during execution of recovery operations for a task terminated; wherein the at least one processor is further configured to: predict availability characteristics for resources over the future time duration for executing the submitted compute task, responsive to predicting availability characteristics for resources based on historical, projected or inferred cost characteristics associated with the resources; wherein the at least one processor is further configured to: predict availability characteristics for resources over the future time duration, responsive to predicting utilization of available resources based on historical, projected or inferred utilization of the one or more provider's resources; wherein the at least one processor is further configured to: determine a utilization model based on the projected or inferred utilization to achieve at least one goal of: maximize revenue, minimize costs, maximize resource utilization, minimize spot kills, minimize time to completion, or minimize power consumption, or some combination of the foregoing; wherein the at least one processor is further configured to: store characteristics of prior task execution (e.g., computation time, memory utilization, storage input/output, network bandwidth); analyze stored characteristics of prior task execution; and predict characteristics of identical or similar tasks; wherein the at least one processor is further configured to: determine a duration of a reservation period for spot instances longer that an individual spot instance time unit; incorporate the prediction of future characteristics of the submitted compute task based on analysis of characteristics of prior execution of tasks identical or similar to the submitted compute task; wherein the at least one processor is further configured to: accept, execute, and complete the task on the one or more providers, incorporates the prediction of future characteristics of the submitted compute task, based on analysis of characteristics of prior execution of tasks identical or similar to the submitted compute task, in planning the execution and completion of the task; wherein the at least one processor is further configured to:

display a management interface for client submission of compute tasks, wherein the interface accepts a user specified compute task and engages resources of one or more providers, selected from a plurality of providers which can include the host of the management interface, to execute the compute task; or wherein the system includes a virtual provider who provides an interface for accepting compute task submission and allocate resources of one or more providers (which may include itself) available through a unified interface.

According to one aspect, a system for managing cloud compute resources is provided. The system comprises at least one processor operatively connected to a memory, the at least one processor when executing configured to: display execution characteristics associated with a first class of resources, wherein the first class of resources are configured for on-demand request and are reserved for execution until completion of an associated compute task, display execution characteristics associated with a second class of resources, wherein the second class of resources are configured such that that the second class of resources can be terminated by the cloud provider at any time; accept selection of the second class of resources; trigger execution of the compute task utilizing the second class of resources; display a modified execution selection provisioned by the second class of resources, wherein the modified execution utilizing the second class of resources is configured to not be terminated until a certain future time, and wherein the modified execution can be provisioned utilizing changing resources of the second class of resources over the course of execution of the compute task; accept selection of the modified execution; trigger modified execution of the compute task utilizing the second class of resources; and manage the modified execution on the second class of resources to maintain execution until the certain future time.

According to one embodiment, the second class of resources are purchased at a variable or fixed price, responsive to submitted bids on the resources, and the resources are purchased and allocated whenever the bids meet or exceed the variable or fixed price at the time. According to one embodiment, the at least one processor is further configured to: accept selection of the first class of resources; and trigger execution of the compute task utilizing the first class of resources.

According to various embodiments any of the preceding methods or systems are implemented to execute all operations referencing one or more providers at least two providers.

Still other aspects, embodiments and advantages of these exemplary aspects and embodiments are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic, described in connection with the embodiment, may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIGS. 2B-C are expanded views of portions of 2A;

DETAILED DESCRIPTION

Figure 1:
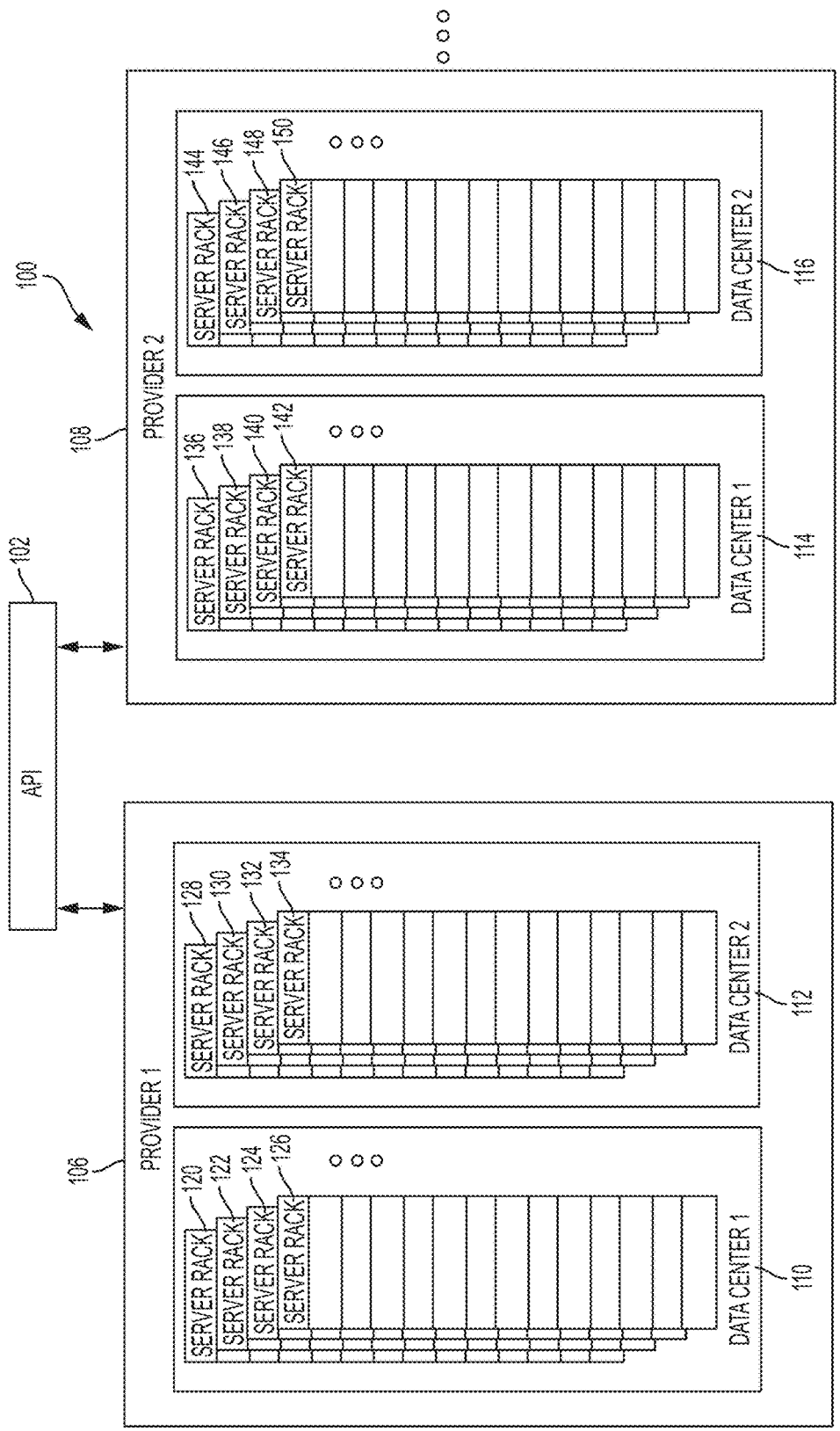
FIG. 1 is a block diagram of an example environment according to one embodiment.

Stated broadly, various aspects of the disclosure describe systems and methods for managing and/or executing spot instances. Various aspects proactively manage early termination (i.e., before customer deallocation or compute task completion) of spot instances, enabling improved utilization of spot instances, and increasing reliability of executing tasks on spot instances. In some embodiments, systems and/or methods are provided for predicting when spot instance kills are likely to occur. These systems and/or methods can be further configured to gracefully handle spot kills issued by Providers (e.g., trigger preservation operations), trigger transitions to spot instances at another provider, trigger increased bidding to preserve current spot instances, and/or trigger a premium payment to allow for execution of preservation operations, among other options.

In other embodiments, the systems and/or methods can put control of spot kill requests into the hands of the customer. For example, a customer API can be configured to request and bid for current spot instances and increase bidding to keep execution underway for a customer's compute task. In one example, the API can be configured to notify the customer when a threshold price has been exceeded (e.g., push notice, e-mail, wall alert, etc.). The notice can provide executable links to offer the customer (e.g., and whatever computing device or management program the customer is using) directly to a spot kill interface. The interface can be configured for an emergency kill (e g, kill instances immediately, typically resulting in lost work and computation), and also provide options for graceful termination of instances that exceed a bid price. Graceful termination can include, for example, a snap shot of current state so an instance can be restarted later or communication of intermediate results for storage and later access, among other options.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Some of the examples described below make use of some or all of the following terms: customer: an entity that obtains resources from itself or other providers; Provider: an entity that makes one or more resources available to its customers at some fixed or variable price. Specific examples of providers are Amazon (Amazon Web Services such as EC2, S3, etc.), Google Compute Platform, or Microsoft (Azure), internal providers operated as private clouds or data centers within large organizations, one or more data centers, distinguished by e.g. location, power availability, or other organizational units within other providers, and virtual providers who assemble and make resources from a group of providers available, each of which makes compute resources available at various pricing models; Instance: a specific instance of a resource allocated to a customer. Customers often allocate multiple identical resources as multiple instances for their compute tasks; Resource: one or more computing resources available from the Provider such as storage, CPU, memory, network bandwidth, network access, or a combination thereof, delivered through a network interface. Resources may be delivered in various ways such as physical or virtual servers connected to a network or a storage API. A specific example of a resource might be an Amazon EC2 "r3.8×large" "instance" that is "optimized to deliver high memory performance and high sustainable bandwidth" located in the "us-east-1" region; SaaS: Software as a Service. Spot Bid: parameters set by a customer for a particular resource available at spot pricing, often provided when a Spot Instance is requested.

These parameters typically include price and type of resources desired but may include others, some of which are described herein; Spot Price: a price quoted for a resource at a particular time that is subject to fluctuation at the provider's discretion, for example, due to market supply and demand. Spot prices are typically not based on utilizing a reserved resource or agreeing to pay a published fixed price for regularly available resources; Spot Instance: an instance of a resource provided to a customer based on a quoted spot price with the understanding that the spot price may change and the instance may cease to be available in the event the Provider kills the spot instance; Spot Kill: when a provider terminates a customer's resource acquired on a Spot Market for any reason, one common example being because the prevailing Spot Price for that resource exceeds the customer's applicable Spot Bid; Spot Market: a collection of Resources, bids, Instances, demand, costs, associated Spot Prices, and other variables; Spot Market Model: A mathematical model, machine learning algorithm, or other analysis tool that can predict variables in a spot market given a set of assumptions; Reserved Instance: A resource reserved by a particular instance and a commitment to a particular payment arrangement; Task: a specification for one or more computing operations (which may include executing and using the results of other Tasks) that can be executed on one or more Resources.

According to some aspects, time-shared computing, networking, storage, and associated technology resources commonly known as "cloud compute" are available from several Providers including Amazon's "EC2", Microsoft Azure, and Rackspace Cloud. In some embodiments, providers publish specific prices for their available Resources. In many cases, these prices are fixed for on-demand instance allocations and priced per hour of usage. In some cases, including Amazon's Elastic Compute Cloud (EC2) Spot Instances, a provider regularly updates prices for available Resources on a "spot" market. Customers then bid a particular price for a Resource, and if their price is higher than the currently prevailing price for such Resource (the "Spot Price"), an Instance of that Resource is allocated to the Customer; this instance will typically be available as long as the Customer's stated price for such Resource is not less than the Spot Price. In this case, if prices rise and the Customer's stated price for a Resource is less than the Spot Price, then the Provider may deallocate any of Customer's instances of such Resource. Such a deallocation is known as a "spot kill" The Provider may have various reasons for a spot kill: for example, the Provider believes it could receive more money for the resource from another party, and reclaims a spot instance ("kills it") to reallocate it to another party with a higher bid; or the Provider may need to kill all spot instances in an area to perform routine maintenance.

At most times, the Spot Price for a Resource is significantly lower than the prevailing price for an equivalent Resource that is guaranteed not to be deallocated or preempted based on price fluctuations (known in EC2 as an "On Demand" or "Reserved" instance). For example, at 9 am EST on Jan. 10, 2015, the spot price for Linux/UNIX usage of a memory optimized "r3.8xlarge" instance in Amazon EC2's US East region was $0.2583 per hour, versus $2.80 per hour for the on demand price—a cost savings of 90.8%. According to some aspects, a resource allocation system enables Customers to identify not only the Resources with the lowest cost at the time Instances are allocated, but also predict which Resources are likely to be the lowest cost over the expected lifetime of the computation, and how to manage Instances of Resources possibly being reclaimed by the Provider during the computation. In some embodiments, cost may be measured in more than dollars—it may be in other factors such as reliability or complexity.

Why would a cloud provider like Amazon make the spot market available at such significant discounts? Like airline seats or hotel rooms, the value of an unused compute resource is forever lost. By selling excess computing capacity at attractively low prices, Amazon and Google are able to monetize excess capacity for computations that can be performed on a variety of resources and/or at off-peak hours such as testing, media encoding, or web crawling. In addition, at the present time, other significant Providers of cloud computing resources like Microsoft Azure do not offer spot pricing. This may keep spot market customers loyal to one ecosystem.

FIG. 1 is an example block diagram of a cloud compute environment 100. Shown om FIG. 1 are a plurality of cloud compute providers (e.g., 106 and 108). An application program interface (API) 102 can be configured to capture resource availability, utilization, current pricing, historical pricing, etc. on Spot Instances made available by the plurality of providers. In some examples, the API can be configured to request Spot instances or other resources from the plurality of providers to create better pricing and availability information. For example, the API can automatically manage submission and cancellation of bids, thereby establishing a customer's current price point for Spot instances. The API 102 can be configured to test ranges of values around accepted bids to better determine current pricing and/or availability. Each of the plurality of providers (e.g., 106 and 108) host a plurality of resources and underlying servers/server racks (e.g., 120-150) that can be provisioned to customers as on-demand resources or as Spot instances. In some examples, each provider can host numerous servers/server racks at a plurality of organizational units (for convenience, referred to as "data centers", although some provider's physical data centers may encompass multiple units) (e.g., 110-116) and provision available resources from any such location.

In some embodiments, API 102 can also be provisioned from one or more of the plurality of providers. In further embodiments, API 102 can also be configured to operate as a network or web based interface for managing Spot Instances. Customers or customers' computer programs can access API 102 via a web portal or web API, and use API 102 to manage use of Spot Instances for their respective compute tasks, with the advantage of having to implement interfaces to only one API, graceful handling (via the API) of Spot Kills, transitions to Spot Instances at another provider, notification of changes in pricing, notification of failed bids or spot kills, managing options for terminating instances with preservation operations, etc.

Example Implementation for Storing and Predicting Time Series of Resource Prices and Availability In some embodiments, each cloud provider publishes its prevailing prices for resources on its website. These are updated in real time; historical data of which may also be publicly available.

Some embodiments are configured to obtain price data either by typical web scraping techniques (regularly downloading a resource from the web and parsing the data, then storing each result in a time series database) or obtaining structured real-time or historical data, then placing the data into a time series database. In some cases only price updates are available (that is, the time series is sparse and includes only time in which the price is different from the previous price in the series); in one embodiment, the data are further analyzed to provide hour-by-hour or minute-by-minute price sequences for easier analysis.

Further embodiments also store other data relevant to predicting characteristics of Resources in the future, such as prices and availability. The data may include whether particular resources are available (or unavailable) at a particular time, instance "steal" (a measure of how much of the Resources available to an instance is used by other co-tenants or the Provider's infrastructure), performance of input/output interfaces, day of week and holiday schedules, any special events (such as a reduced supply due to a significant outage or increased demand due to retail and e-commerce analytics activity common during the holiday shopping season), and any other pertinent information that can be gathered, tracked and recorded.

Figure 2A:
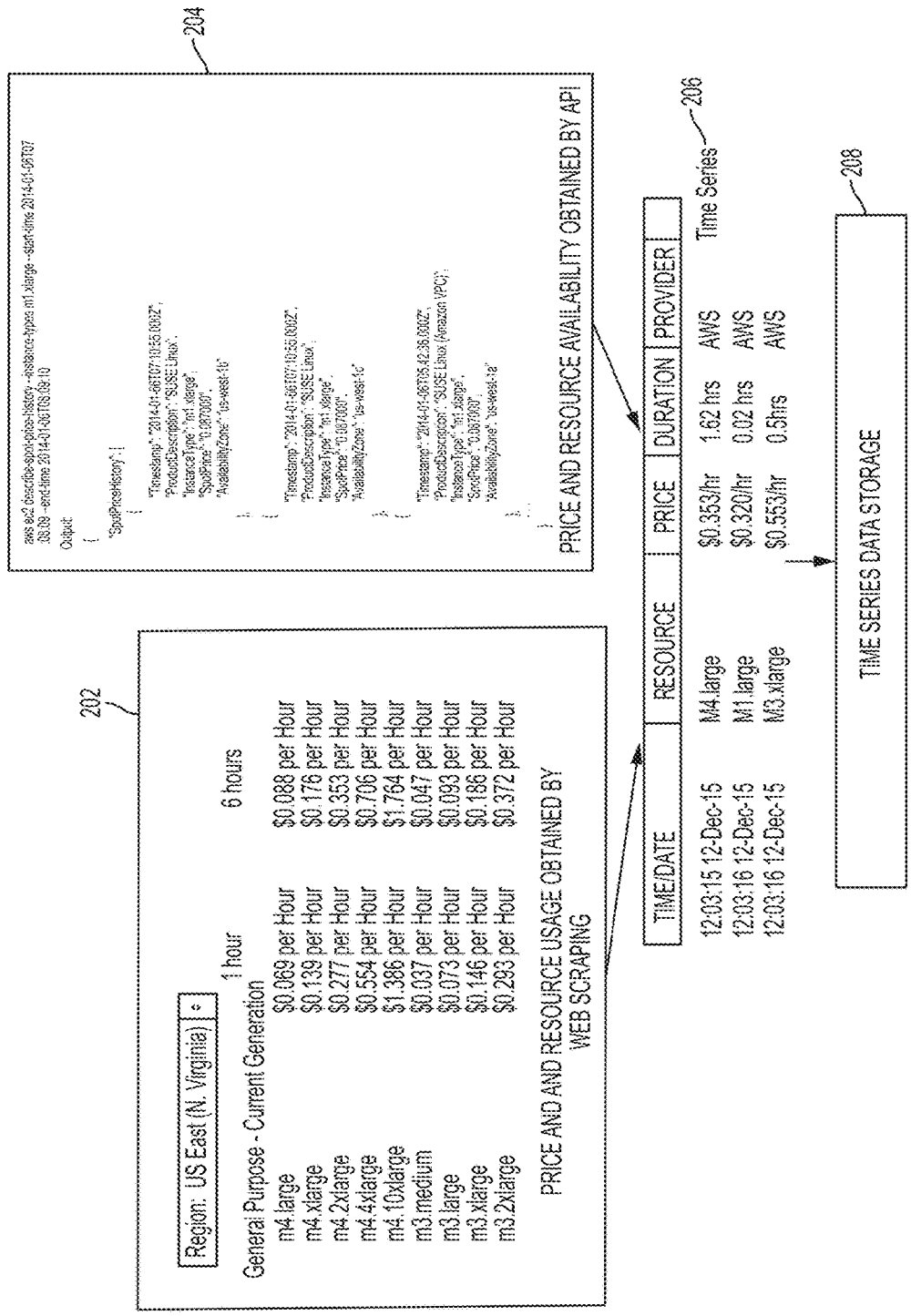
FIG. 2A is an example logic flow for storing time series data, according to one embodiment.

Shown in FIG. 2A is a logic flow for capturing time series data. In one example, a spot instance management system can be configured to capture time series data of resource characteristics (e.g., price, availability, resource type, etc.). For example, resource characteristics can be obtained by web scraping provider sites (202) or a system API can capture characteristics on resources (204) and one or both can be used to generate time series data on resource characteristics across one or more providers 206. Time series data storage 208 can be implemented as a separate database in one example. In another example, time series data storage 208 can be a cloud resource. FIG. 2B is an expanded view of 202 and shows some example characteristics that can be captured from scraping provider websites. FIG. 2C is an expanded view of 204 and shows data and format captured by an example API.

According to one embodiment, after the time series of prices and other data has been stored in a database, the time series can be analyzed using any number of various established techniques to predict future prices, many of which have already been applied to time series in other fields, one notable example being the prediction of securities prices in financial markets using price and volume time series in conjunction with fundamental data about the securities. In some embodiments, prediction models are specially adapted to predicting resource characteristics (e.g., cost, availability, utilization, etc.). Various aspects are not limited to specific methods of predicting future prices in the time series, but can include the application of these methods to predict future prices of computing resources based on historical data. Various embodiments implement different methods of predicting time series data (e.g., combine different methods of predicting). Some examples describe some methods specifically, namely: moving average (whether unweighted or weighted, e.g. linearly, geometrically, exponentially), various autoregressive conditional heteroskedasticity models (ARCH, GARCH, IGARCH, etc.), or various machine learning algorithms (for example neural networks, support vector machines, ensemble learners of various other algorithms), where each model or combination of models is specifically tailored to predict resource characteristics. Other embodiments incorporate one or more of the preceding or rely on any combination, and can use different prediction schemes or models.

In one example, price data for a particular resource is predicted based on taking the exponentially weighted moving average ("EWMA") of the prevailing prices for that resource over the past 10 weeks at the same time of day and day of week, for example, Monday morning at 9 am US/Eastern. Then the price for the same resource will be predicted to be the EWMA of the past 10 Monday mornings at 9 am US/Eastern. A similar approach can be applied to other characteristics, as well as other models (as described above).

Figure 3:
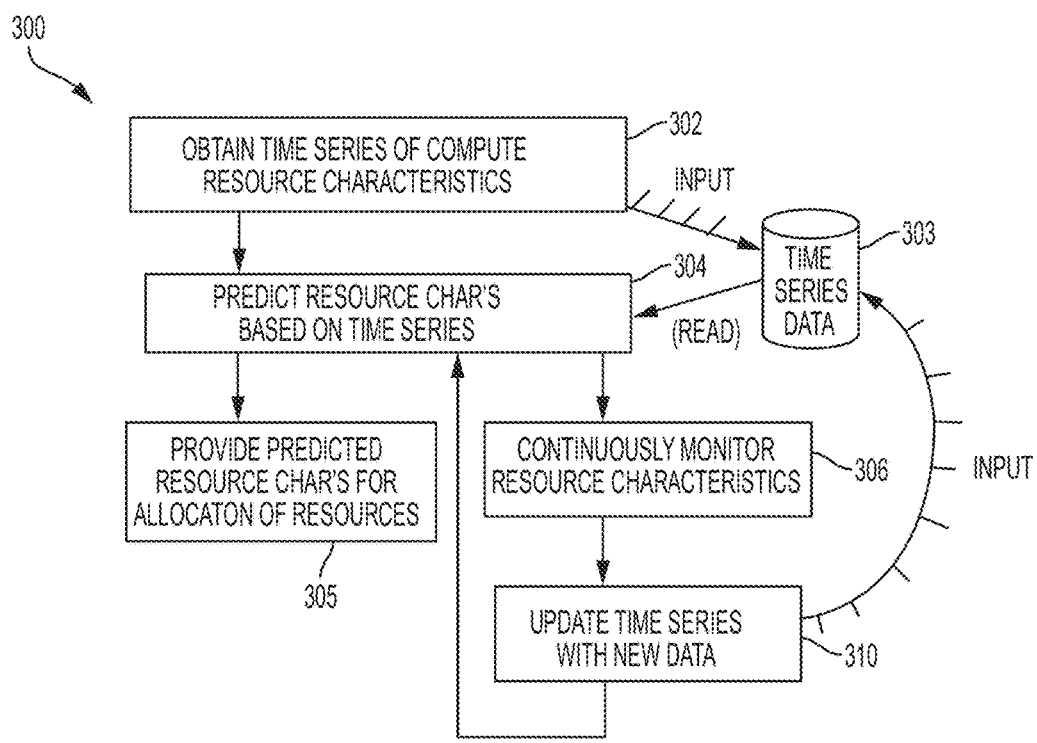
FIG. 3 is an example process flow for allocation of compute resources, according to one embodiment.

FIG. 3 is an example process 300 for processing time series data for the allocation of compute resources (e.g., Spot Instances). Process 300 begins at 302 with obtaining initial time series data (at 303) of compute resources. In one example, an API (see 204) can capture resource characteristics and build times series data (at 303) for the resources as part of 302. In another example, web scraping functions (see 202) can be executed by a system for managing spot instances to capture resource characteristics and/or build time series data (e.g., at 302). At 304, the time series data at 303 are analyzed to predict future resources characteristics (e.g., pricing, availability, utilization, among other examples).

At 306, resource characteristics at a compute provider is continuously monitored. The time series at 303 are updated with new readings of resource characteristics at 310, then the predictions made at 304 are updated with the newly available time series data (at 303) and monitoring continues at 306. Predictions may be made and updated at 303 at any time. In one example, as time passes, future predictions of resource characteristics can become more certain, resulting in updated predictions. The predictions at 305 can be provided in determining allocation of compute resources, or, for example, identifying the optimal location to request Spot Instances from one or more compute providers.

Example Implementation for Choosing Resources Based on Cost Per Performance Unit According to one embodiment, after a database of prices for Resources has been generated and/or stored for each provider, the database can be augmented with the expected performance of each Resource for a particular class of computation. In one embodiment, in a cloud testing application, Customer can run a software's test framework on various Resources available from Provider, then assigns performance characteristics to each Resource. This assignment can be made by manual estimate, performance against standard benchmarks, or performance on a particular application or even instantiation of an application (such as a testing application running a particular suite of tests.) These performance characteristics may include any relevant data, for example: efficiency of computation (time to complete a benchmark); available RAM memory; available storage;

network throughput, latency and bandwidth costs to a particular data store; co-tenants (other Customers using the same Resources, such as the same computing nodes, network bandwidth, or remote storage, at the same time), etc. Then each available Resource can be evaluated on the basis of cost per unit of performance.

In one example, assume that the Customer has determined that the small Resource is 1 "unit", the medium Resource is worth 2 small instances (2 units), and the large Resource is worth 3 medium instances (6 units). Because the prices of Resources may change over time, the optimal allocation of Resources may also change over time. Some embodiments include calculations not only for allocating the Resources that are optimally priced for the task when the task is initiated, but also to predict the cost of the allocated Resources over the predicted possible durations of their allocation. Provided the predictions are no less accurate than the null prediction (no change in prices over time), incorporating future price fluctuations into the resource allocation plan should yield a better overall price for the desired computation and help to optimize cost versus time.

Figure 4:
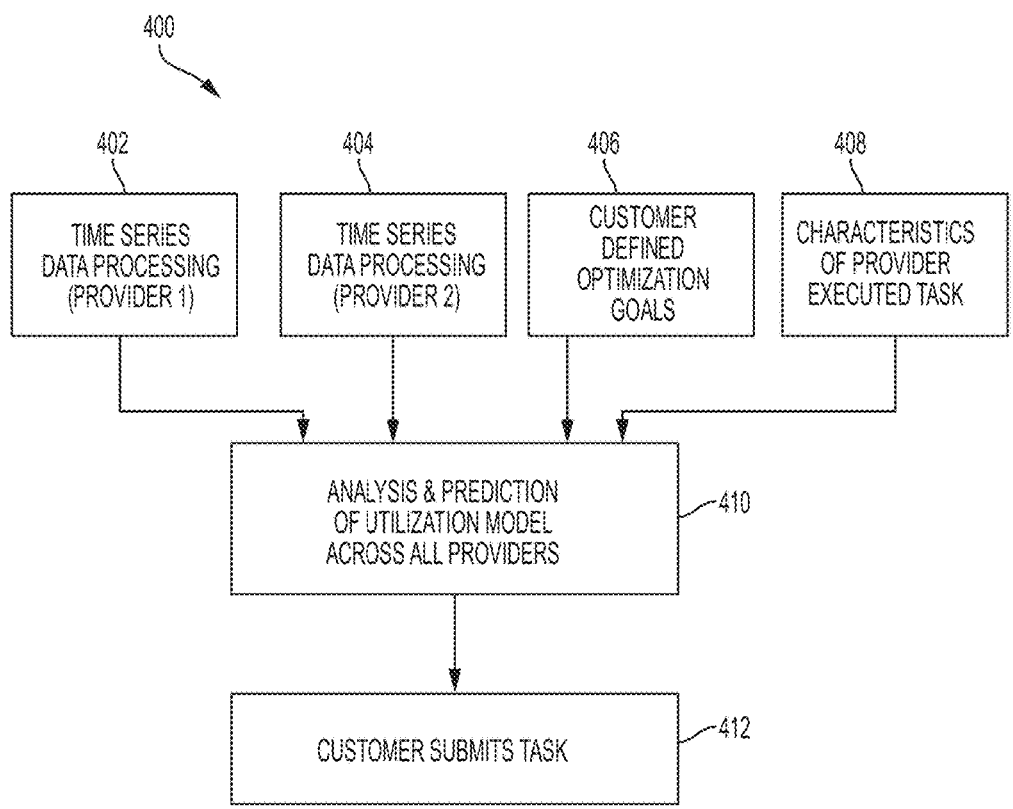
FIG. 4 is an example flow for accepting a user compute task, according to one embodiment.

FIG. 4 illustrates an example flow 400 for accepting customer submission of a compute task. Process 400 begins with access to time series data stored about resource characteristics from multiple providers. In one example, time series data can be accessed separately with respect to a first provider 402 and a second provider 404. (Using two providers is illustrative; an embodiment may use time series data from any number of providers, stored together or separately.) In conjunction with customer provider optimization goals 406 and characteristics of the provider executed tasks 408, analysis can be performed with predictions of resource characteristics across a plurality of providers at 410. The analysis uses predictions on resource characteristics (e.g., pricing and/or utilization and/or availability) to optimize bids for Spot Instances, which may be placed at any number of providers. Based, for example, on the predictions and analysis, a customer can submit a task for execution at 412. In some embodiments, the submission of a task can be accepted by a spot instance management system configure to manage Spot Kills of the associated resources being used. In another embodiment, the system can automatically handle transitions between providers to continue task execution with other Spot Instances as prices, availability, and/or utilization fluctuate. In yet other embodiments, the customer is provided a submission interface for compute tasks, and the system responds to the customer's submission by allocating the compute task or portions of the compute task to one or more providers. In some examples, the system can be configured to alter customer submitted tasks to permit operation at multiple providers (e.g., communicate results to Provider 2 instance, etc.).

Example of Storing Task Characteristics to Align with Future Resource Characteristics In some embodiments, characteristics of a task are provided when the task is defined and submitted to a Provider. In other embodiments, the system running a task records and stores characteristics about certain tasks that Customer may designate as likely to be run again ("repeated tasks"). In these embodiments, characteristics important to resource allocation, including processor time, total memory utilization, storage input/output, network bandwidth, database accesses, and potentially others, are reported by the Resources or the system managing the Resources during the execution of the task and stored in one or more databases for future analysis. Once the task has been executed, the resources required for a future execution of the same task can be estimated using various standard prediction tools described herein, or tools described elsewhere in the literature. There is no guarantee that a future execution will require the same resources, but for tasks that are repeated frequently, past patterns do emerge and can be used to automatically optimize resource allocation. In the general case, this becomes an optimization problem to efficiently allocate resources for a task with certain characteristics that are automatically inferred from prior executions of the task instead of obtained from the definition of the task.

According to one embodiment, (including for example, a cloud testing system that runs a suite of software tests on a software code base), the system would record important characteristics (described earlier in this section) while running the suite and associate those characteristics with a particular test suite. The next time the suite is run, the system would identify it as a repeated task and attempt to identify an optimal matching of Resources to run the repeated task based on prior execution of the task. In one example, the system can be configured to determine that the suite uses only a modest amount of memory and allow the allocation of lower cost Resources with less memory to save money; in another example, the system can be configured to determine that the suite uses a large amount of disk storage input/output and that by allocating Resources with attached flash storage in the future, the time to completion can be lowered which reduces computation time—despite a higher per-hour cost for those Resources.

In yet another example, the system might have enough information about the past behavior of the task that the system can predict with an acceptable degree of confidence (e.g., exceeds a system specified confidence level) that the task will run on a certain set of Resources for a limited amount of time, and can predict with confidence that those Resources will be available for that amount of time. In the event the prediction is wrong (either because the Resources are not available or the task exceeded expected requirements), the system can checkpoint and stop the task and run in a better location, or may determine that the Provider terminates the task (e.g. in a spot kill) and automatically recover from that termination.

Example of Using Predicted Resource Characteristics to Allocate Resources

In the next step, some embodiments model the nature of the intended computation to be performed on the designated Resources and estimate the amount of computing resources required to perform the computation. Again, various embodiments, can implement different algorithms for estimation, but rather the process of using the predicted Resource characteristics, such as price, availability, network performance, storage performance, and so forth, to identify the optimal resources to allocate for the required computations is integrated into various embodiments and be configured to handle different estimation algorithms. For example, the estimation algorithm might deliver a profile of the computation that can be used to identify various "baskets" of resources (e.g., one or more or combinations of price, availability, network performance, storage performance, etc.) that could be used to perform the computation. These baskets can then be compared to one another based on the predicted characteristics of both the resources and the computation to identify the lowest expected cost for the computation.

Simple Example: Optimizing for Cost

According to one embodiment, a model of the computation might be estimated using available instances of small, medium and large Resources in which a medium instance is twice as powerful as a small instance and a large instance is thrice as powerful as a medium instance (6× a small). Assume the computation can be computed with 11 small instances. Assume also that the "unit" is one hour of a small instance, that is, compared to one hour of a small instance, a medium instance performs the same computation in 30 minutes and a large instance performs it in 10 minutes. In practice, the invention may be practiced with a billing unit of any time scale, but described are examples using one hour as a convenient scale. Table I shows values for resources type, scenario 1: Price, quantity (Qty); scenario 2 Price, quantity (Qty).

TABLE I

| Resource Type | Scenario 1 Price | Scenario 1 Qty | Scenario 2 Price | Scenario 2 Qty |
|---|---|---|---|---|
| Small (1 unit) | $0.09 | | $0.09 | 1 = $0.09 (1) |
| Medium (2 units) | $0.20 | | $0.17 | 2 = $0.34 (4) |
| Large (6 units) | $0.45 | 2 = $0.90 (12) $0.90/hr (12) | $0.45 | 1 = $0.45 (6) $0.84/hr (11) |

In Scenario 1, the optimal allocation is to purchase two large instances which yield 12 units of computational power, despite yielding an excess of one unit, because any other way of purchasing 11 units would cost more ($0.99/hr for 11 small instances or even more using any medium instances). In Scenario 2, the optimal allocation changes due to a 15% decrease in the price of medium instances, making it slightly cheaper per hour to assemble 11 (6+4+1) units from 1 large (6), 2 mediums (2×2=4) and 1 small (1). Although this is a small difference, across thousands of hours of computation even a 6.7% cost savings can be significant.

Complex Example: General Fitness Optimization

Various embodiments may also be used to optimize resource allocation for one or more computations based on a number of factors and resources. In the following example, we specify a set of fitness functions and constraints that are optimized for the computation; the invention permits such functions to be specified as any function, though linear and quadratic functions permit easier optimizations using standard techniques.

The following fitness function $f$ weights cost most heavily, then speed, plus the added constraint of an acceptably low risk of early termination (put another way, the likelihood of a Resource being killed):

Risk of termination within minutes<5%
Optimize for $f(cost, minutes) = -cost - 2*minutes$
cost is the total cost of computation in US cents
minutes is expected wall clock time to completion Thus, the optimal (most positive or least negative) result will be the lowest cost comparing two computations of the same elapsed time, but a computation taking one hour would be worth paying $1.20 more than a computation taking two hours.

In the following example, the computation is estimated to take 72 units and may be parallelized across 4 discrete processing units (each unit of which may take advantage of up to 4 cores each). Assume again that the "unit" is one hour of a small instance, that is, compared to one hour of a small instance, a medium instance performs the same computation in 30 minutes and a large instance performs it in 10 minutes. "u/h" means units per hour. "Risk" means the risk of an early termination within the hour. Assume for simplicity that the predicted risk (per hour) changes only change at hours 5, 10 and 15, and that the computation must be completed within 20 hours. Table II shows resource type, price/risk by hour periods.

TABLE II

| Resource Type = u/h | Hours 1-5 Price/Risk | Hours 6-10 Price/Risk | Hours 11-15 Price/Risk | Hours 15-20 Price/Risk |
|---|---|---|---|---|
| Small = 1 | $0.09/.1% | $0.09/.3% | $0.09/.4% | $0.22/2% |
| Medium = 2 | $0.20/.1% | $0.20/.2% | $0.20/.4% | $0.17/3% |
| Large = 6 | $0.75/.1% | $0.75/.2% | $0.95/1% | $1.24/2% |

The lowest cost would clearly be to allocate 4 small instances for 18 hours ($6.48). However, the risk of termination at hour 15 becomes high enough that the probability of early termination exceeds the 5% threshold. The fastest possible computation would be in 3 "wall clock" hours by allocating 4 large instances ($9.00), but that is too expensive. The lowest cost option that does not violate this constraint is to allocate 3 small instances for 15 hours and 1 medium instance for 13.5 (effectively 14) hours, specifically $6.85.

In addition, in some embodiments the system is configured to incorporate the "cost" associated with each passing hour of computation time (or, put another way, the "value" of having our results an hour earlier), at $0.25 per hour.

According to one example, after factoring in the value of speed, the best solution is to allocate 4 medium instances for 9 hours, at $7.20+$2.25=$9.45, as using small instances costs $6.85+$3.50=$10.35 (too slow) and large instances (too expensive) add a net of $0.05 per hour of using 2 large instances instead of 6 medium instances. (The system determines that using an odd number of large instance hours is less efficient due to wasted time as can be seen by using 1 large.) However, if the value of speedup is valued more highly than $0.30 per hour (the equilibrium point) then using pairs of large instances makes more sense. Table III describes for each hour allocation between instance types and costs.

TABLE III

| HOUR | Possible Configuration of Medium and Large Instances | | | | |
|---|---|---|---|---|---|
| Hour 1 | 4M = 8 | 1L + 3M = 12 | 2L + 2M = 16 | 4L = 24 | 4L = 24 |
| 2 | 16 | 4M = 18 | 4M = 24 | 32 | 4L = 48 |
| 3 | 24 | 26 | 32 | 40 | 72 |
| 4 | 32 | 34 | 40 | 48 | |
| 5 | 40 | 42 | 48 | 56 | |
| 6 | 48 | 50 | 56 | 64 | |
| 7 | 56 | 58 | 64 | 72 | |
| 8 | 64 | 66 | 72 | | |
| 9 | 72 | 74 | | | |
| At $0.25 per hour | $7.20 + $2.25 time = $9.45 | $7.75 + $2.25 time = $10.00 | $7.50 + $2.00 time = $9.50 | $7.80 + $1.75 time = $9.55 | $9.00 + $.75 time = $9.75 |
| At $0.30 per hour | $7.20 + $2.70 time = $9.90 | $7.75 + $2.70 time = $10.45 | $7.50 + $2.40 = $9.90 | $7.80 + $2.10 time = $9.90 | $9.00 + $0.90 time = $9.90 |
| At $0.35 per hour | $7.20 + $3.15 time = $10.35 | $7.75 + $3.15 time = $10.90 | $7.50 + $2.80 time = $10.30 | $7.80 + $2.45 time = $10.25 | $9.00 + $1.05 time = $10.05 |

The value of the additional speed of the large instances can be valued and optimized by various algorithms and tools well known in operations research to solve integer, linear and/or quadratic programs. Although the problem described above can be solved by simple algebra, a Simplex algorithm or tools like CPLEX can be used to solve similar problems for more complex situations: for example, where the computation is larger, the fitness or cost functions are nonlinear, or a large number of possible resources may be allocated. Various embodiments can implement various algorithms or tools (e.g., Simplex or CPLEX) to resolve these determinations for more complete scenarios.

Figure 5:
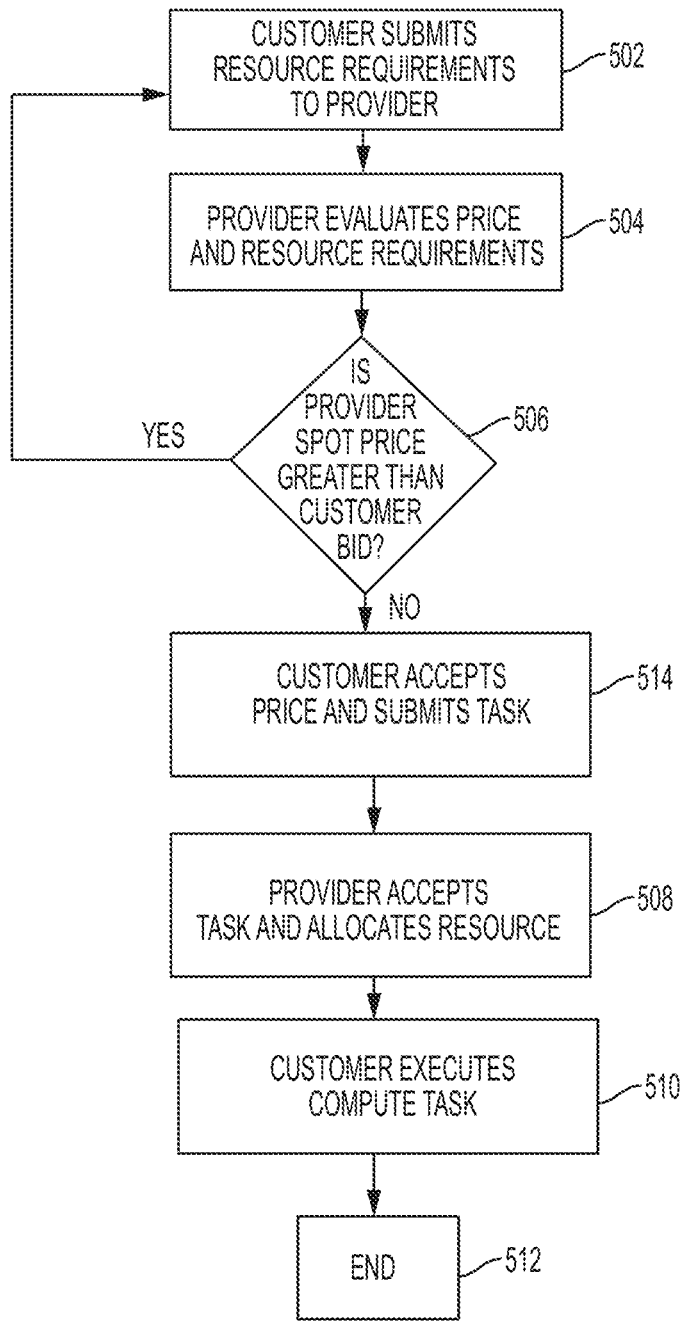
FIG. 5 is an example flow for the initial execution of a compute task at a provider.

FIG. 5 illustrates an example flow 500 for executing a compute task by a given provider. Process 500 begins with the customer submitting a request at 502 to provider, which can include for example (a) submitting resource requirements to provider with a specific bid price, or (b) a query to the provider for prevailing prices for specific required resources. At 504 provider evaluates the request and its internal value for the required resource and returns an answer to Customer, either (a) the bid is accepted or rejected or (b) the price for the required resources. A decision 506 is made to begin the task or not, either (a) the bid is accepted and the task is begun or (b) the customer determines that the price is acceptable and accepts the price (514). Once the decision is made the task specification is provided at 508 to the provider, who allocates the accepted resources (508) and executes the task on those resources at 510. The task is completed at 512 and the resources are deallocated or released.

Example Implementation for Predicting, Handling, and Recovering from Spot Kills

Because the risk of a spot instance being killed is orders of magnitude more likely than an on-demand or reserved instance disappearing, the system architecture must be designed to handle spot kills gracefully.

One aspect of the disclosure is generally directed to monitoring processes and monitoring other features of running instances to predict when a spot kill is impending. In some cases, a Provider will identify a spot instance to be killed and begin preparing for it to be killed before notifying Customer's software or other APIs of the spot kill. The disclosure describes embodiments that include technology for monitoring running processes and monitoring system performance to predict future spot kills. In a simple example, the "shutdown" process is initiated exogenously. As soon as this is detected, the system infers that a spot kill is impending and can "clean up" as much as possible before the shutdown process terminates all computations. In another example, more subtle system performance may be monitored, such as inbound network connections, I/O performance, etc., that are associated with spot kills, and inferences made in the future when events correlated with spot kills occur.

According to one embodiment, the system and/or API tracks performance characteristics (e.g., new connections, I/O performance, etc.) and associates those characteristics with a spot kill. Any timing information observed for the spot kill can also be associated with a spot kill model. The system and/or API can use the characteristic models to identify the same or similar characteristics occurring and/or predicted for executing instances and thus predict a spot kill before notification.

In another example, embodiments can combine various aspects of the disclosure to improve prediction of spot kills. Because a system can predict Resource price movements based on the time series of prices, a system can also predict with more advance notice when resource prices will rise above bids for spot Instances and lead to spot kills. In this example, the system monitors the Resource prices for all running Instances and both updates their current prices in the time series and their predicted future prices, all as quickly as possible. In many cases, changes in actual real-time prices will lead to updating the expectation of future prices; as the hour from 1 pm to 2 pm passes, the price at 3 pm is an hour closer and the system uses a 2 pm price to help the system increase accuracy in a prediction—a system may be configured to make better predictions of every future moment as each hour passes. Thus, although changes in current prices may not be substantial enough to lead immediately to a spot kill, changes in current prices may be substantial enough to lead the predictive model to predict higher prices in the future than were expected when the computation was planned, the spot price was bid, and the instance was allocated. If these predicted prices are higher than the bid price for the spot Instance, then a system can infer the likelihood that these predicted prices will occur, triggering a spot kill. A system can also predict that likelihood over time. In practice, the time series changes as new information comes in, and predictions can be continuously calculated and updated.

Table IV plots for an instance of this Resource has been allocated with a maximum bid of $2.25 per hour, and that the six-hour computation is planned to begin at 5:00 am and end at 11:00 am.

TABLE IV

| Time | Price | Time | Price | Time | Price | Time | Price | Time | Price | Time | Price |
|---|---|---|---|---|---|---|---|---|---|---|---|
| 5:00 | $1.25 | 5:00 | $1.25 | 5:00 | $1.25 | 5:00 | $1.25 | 5:00 | $1.25 | 5:00 | $1.25 |
| 6:00 | *$1.30* | 6:00 | $1.30 | 6:00 | $1.30 | 6:00 | $1.30 | 6:00 | $1.30 | 6:00 | $1.30 |
| 7:00 | *$1.35* | 7:00 | *$1.35* | 7:00 | $1.80 | 7:00 | $1.80 | 7:00 | $1.80 | 7:00 | $1.80 |
| 8:00 | *$1.50* | 8:00 | *$1.50* | 8:00 | *$2.00* | 8:00 | $1.90 | 8:00 | $1.90 | 8:00 | $1.90 |
| 9:00 | *$2.00* | 9:00 | *$2.00* | 9:00 | *$2.50* | 9:00 | *$2.40* | 9:00 | $2.40 | 9:00 | $2.40 |
| 10:00 | *$2.05* | 10:00 | *$2.05* | 10:00 | *$2.55* | 10:00 | *$2.45* | 10:00 | *$2.45* | 10:00 | $2.10 |

Bold face shown in Table IV indicates times where actual prices have been recorded.
*Italics* indicate predicted prices.

As shown in Table IV, when the computation was planned, spot prices were expected to increase substantially as working hours began. However, at 7:00 am, one of the zones in the same region went offline. This changed the predicted prices for the remainder of the computation. Note that the system did not yield a predicted spot kill immediately—the 7:00 am price and predicted 8:00 am prices were still below the $2.25 maximum bid—but that by updating the time series with the 7:00 am price (and possibly information that a comparable zone of resources had gone offline), the predicted prices increased so that the prices at 9:00 and 10:00 am were predicted to be above the bid, creating a significant risk of a spot kill at 9:00 am.

Whenever a spot kill is anticipated, for example, due to newly predicted price increases or notification event, various embodiments are configured to help Customer better prepare for such an event. In one example, the customer could use the invention to update the computation plan with significant lead time before the spot kill. For complex computations, the computation plan could even include bringing up other instances with the same or another Provider before prices are predicted to increase, rerouting existing computations to these other instances, storing intermediate results to restart the computation later, or various other ways of handling spot kills. In cases where Provider permits Customers to update bids, Customer could even decide whether to update a bid to a higher amount in real time if that yields the best outcome given the new information.

Analysis and Prediction of Resource Characteristics to Predict Spot Kills

Spot kills are typically the result of a providers' resources becoming worth more to other participants in the market than the customer to which the resources are currently allocated. This is true both in providers such as Amazon EC2, where the prevailing spot bid exceeds a customer's spot bid, and Google Compute Platform, where the instance is pre-empted by another customer. In order to predict the likelihood of a spot kill, in one embodiment using Amazon EC2 spot instances as an example, the time series of price data described above is used to predict a probability distribution over the possible prices of the resource for the near future, during which a compute task is contemplated to be executed. Using standard statistical methods on this distribution, the probability of a spot kill can be calculated from the probability that the price will exceed the customer's bid. If, based on analysis of prior prices from which the distribution is derived, the probability is high, e.g. 90%, that the price will exceed the customer's bid, then a spot kill is likely. In other example, different probabilities can be used (e.g., 95%, 85, 86, 87, 88, 89, 91, 92, 93, 94 etc.).

Some embodiments, implement this method to determine the probability of a spot kill due to price changes. In other embodiments, changes in availability, utilization, etc. can be used to determine the probability of a spot kill.

Similar methods can be employed in other embodiments, including for example embodiments which incorporate machine learning to model probability of other resource characteristics, such as steal, "signal" processes such as "shutdown" that indicate a spot kill is impending, etc. Various embodiments are configured to apply probability analysis to historical time series of resource characteristics (e.g., price, availability, utilization, combinations of the preceding, etc.) to predict when a resource is likely to be killed by the provider. In some embodiments, various thresholds for likelihood of Spot Kills can be implemented to trigger preservation operations. In further embodiments, relative thresholds are implemented based on confidence levels associated with a prediction. For example, as time progresses, predictions become more accurate, and confidence values associated with spot kill predictions become more certain. As the level certainty increases so too can the system implement an increasing threshold associated with executing preservation operations for a given probability of a spot kill occurring.

Figure 6:
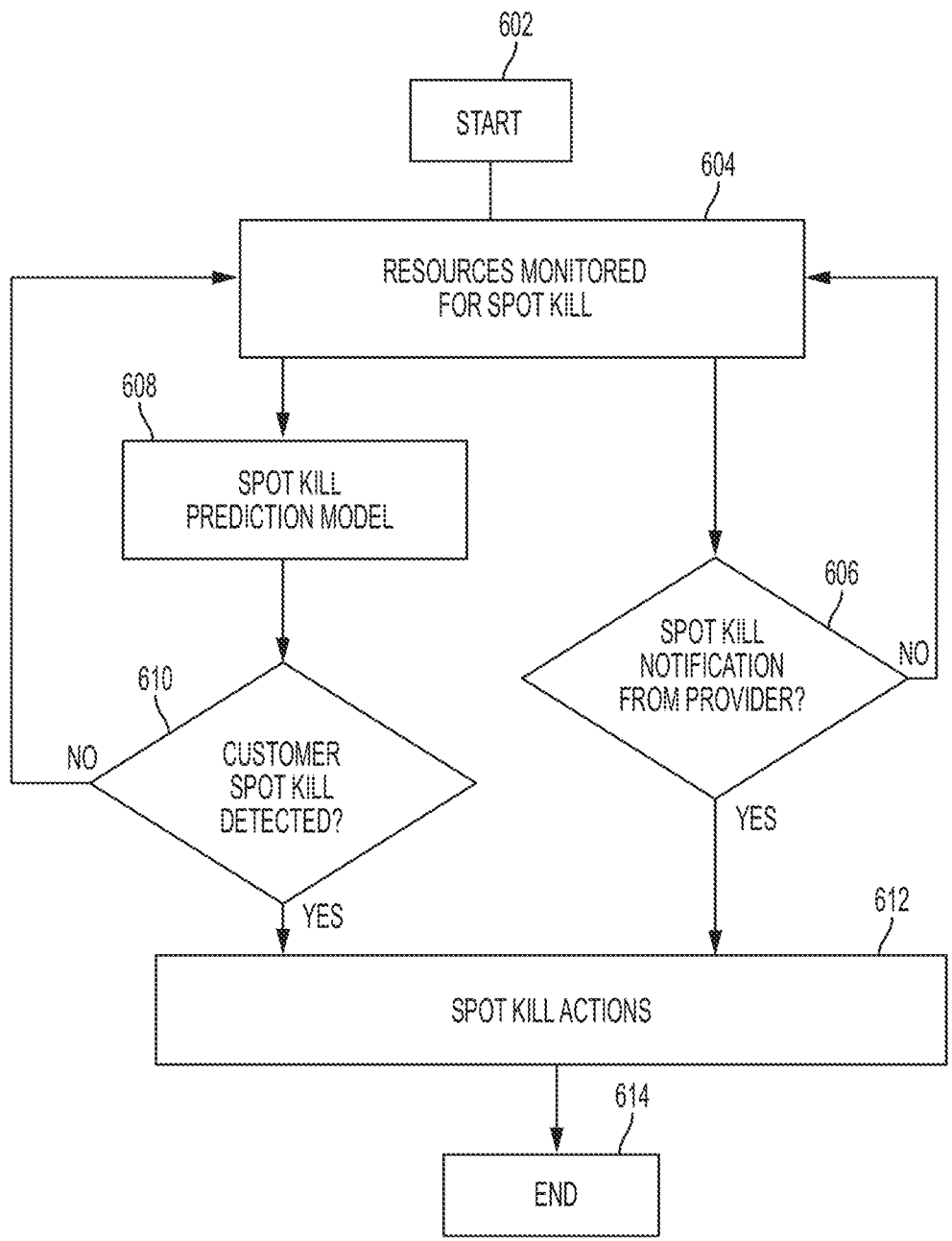
FIG. 6 is an example flow for the continuing execution of a task that will process a spot kill notification.

FIG. 6 illustrates an example flow 600 for handling providers' forced deallocation of customer-assigned resources (a "spot kill") Process 600 begins with the execution of customer's compute task at 602 (which is some examples is comparable to step in process flow 500 at 510). At 604, during execution of the compute task, the resources assigned to the task (for this process flow, "resources") are continuously monitored for resource characteristics and spot kills; actions are taken to handle a spot kill at 612 if either (a) at 606, if provider issues a notification that one or more resources will be killed, or (b) at 608, if customer's model of spot kills (i) predicts a spot kill is impending or (ii) determines that for some reason (e.g. the prevailing price for the resource is now too expensive, behavior of the system predicts a spot kill, etc.) the instance should or may be killed by either the customer or the provider. Additional examples of implementation and execution of the predictive model 608 are further described in example process flow 700. Additional examples of implementation and execution of actions 612 in response to the predicted spot kill are further described in example process flow 800.

Figure 7:
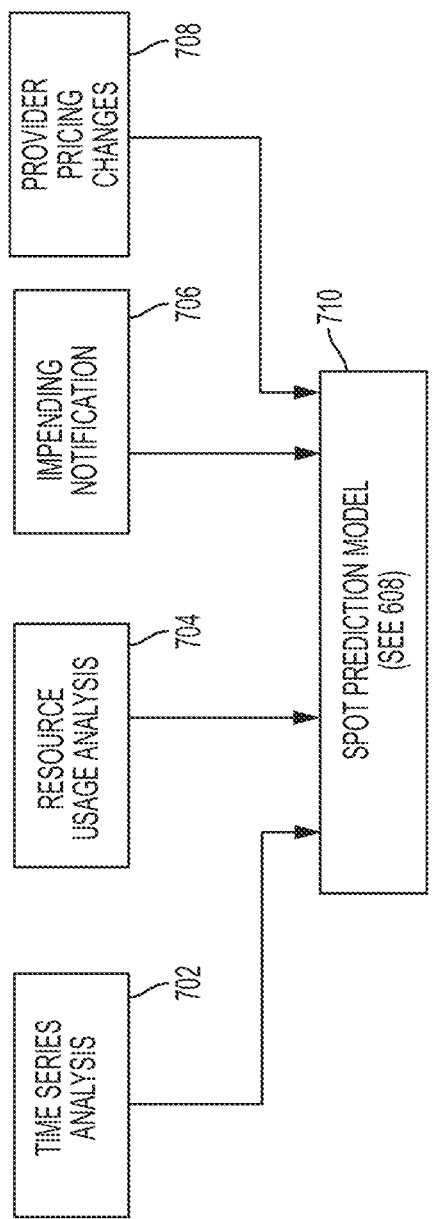
FIG. 7 is a block diagram of the data and flow required to compute the Spot Kill Prediction Model.

FIG. 7 illustrates an example flow 700 for predicting or initiating spot kills. At 710 a prediction model accepts various inputs including analysis of time series of resource characteristics at 702, analysis of usage on the resources allocated to the task at 704, receipt of a notification (either provider- or customer-initiated) of an impending spot kill at 706, or an evaluation of provider pricing changes at 708 that either predict an impending spot kill or render the resources prohibitively expensive.

Figure 8:
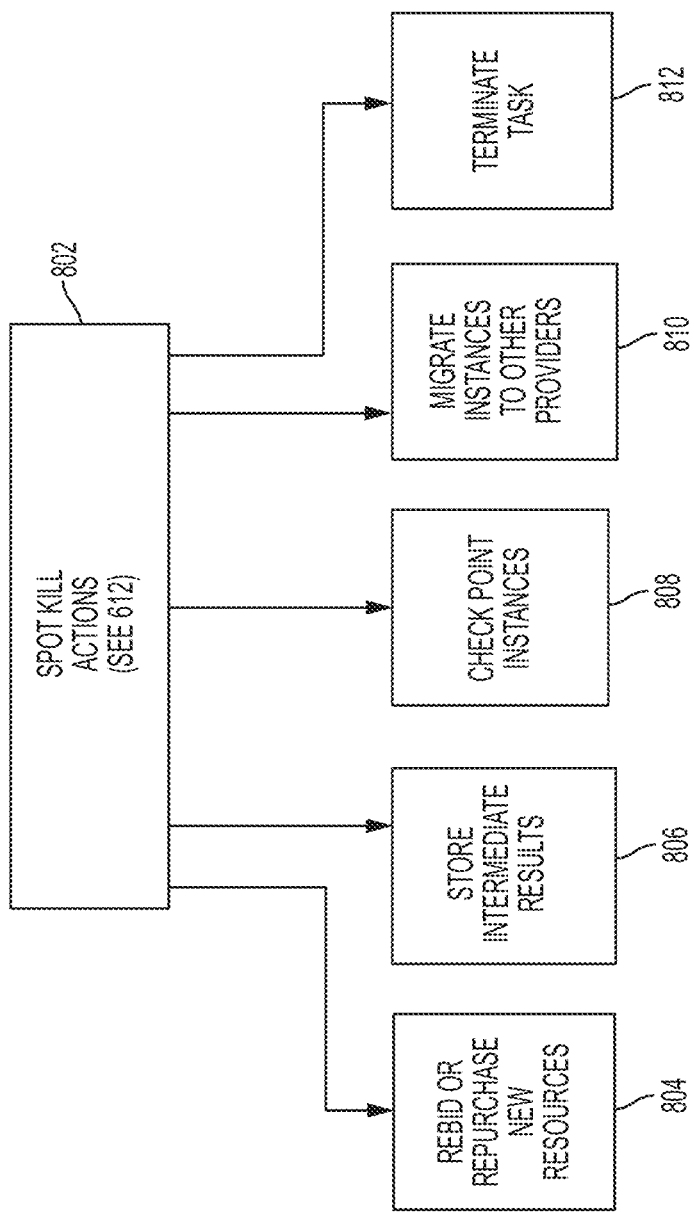
FIG. 8 is an example flow for action responsive to a Spot Kill notification.

FIG. 8 illustrates an example flow 800 for taking actions in response to a predicted or notified spot kill. At 802, a process determines which of various actions to take: modifying bids for existing resources or purchasing new resources at 804; storing at 806 intermediate results of tasks running on resources to be killed, which results can be used to restart tasks in a partially completed state; checkpointing at 808 a resource by storing the entire state of the resource, for example, including storing all memory and long-term storage to other storage resources; or migrating at 810 affected resources to other resources at the same or another provider, optionally using the intermediate results and checkpoints; or at 812 terminating the task and releasing the associated resources.

Figure 9:
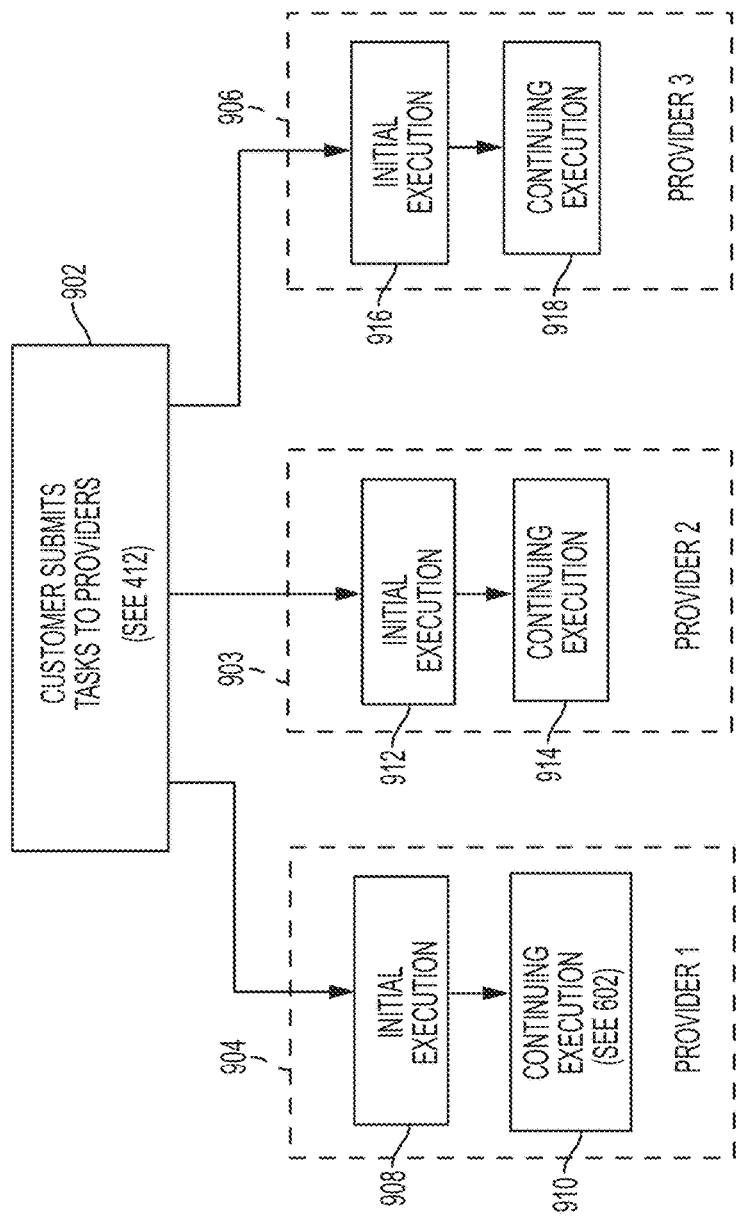
FIG. 9 is an example flow illustrating the submission of multiple compute tasks to multiple providers.

FIG. 9 illustrates an example flow 900 for submitting tasks to one or more providers for execution, the embodiment in example flow 900 illustrating three providers 903, 904 and 906 (which may be the same or different providers in practice). The customer submits a task to provider 902 which using details provided in the task definition, or by analysis of the task and updating the definition, identifies three subtasks that will be optimally run on providers 904 (one subtask, initially 908) and 906 (two subtasks, initially 912 and 916). The provider 902 submits these subtasks to providers 904 and 906 who, respectively, initialize one computation (subtask 908), and two computations (subtasks 904 and 906). Over time, the computation of these subtasks continues, respectively (910, on provider 904; and 914 and 918, on provider 906). This continued execution is monitored using other aspects of the invention, for example in process 300 at 306, where the characteristics of the resources continuously executing subtasks, at 910, 914 and 918, are monitored and stored for further analysis.

Summary: Customers can Optimize Price Over Time and Reduce Spot Kill Risk

Customers who are able to analyze historical spot data (as discussed herein) can use this information to bid more strategically and reduce cost. Various embodiments have been discussed including how a customer can use the invention to analyze a set of resources and bid on the optimal basket of resources—weighing various factors such as total computation cost, time to completion, and risk of spot kills.

Example Implementation of Notification, Payments and Alternatives

Amazon has begun notifying instances with advance notice that a kill is imminent, which permits the instances to prepare to shut down and save any intermediate computations.

One aspect of the disclosure describes systems to improve on simple notifications (e.g., increasing notification time via prediction) and to enable dynamic bidding for spot instances (e.g., responsive to prediction and/or notification of termination). Rather than requesting instances of resources based on issuing fixed bids for each Resource, for example, in the most general case the Customer can update spot bids in real time for both existing Instances and desired future Resources. In a more specific case, before a spot kill is issued, a Provider could query a Customer through an API to notify it that a spot kill was imminent and give the Customer a set of options for each of one or more Instances, for example:

Snapshot and reinstate the Instance at a future time when prices drop.

Snapshot and restart the computation (or Task) by recording intermediate results from the computation; the computation can be restarted on a new Resource (on any Provider) with the intermediate results to save time.

Terminate the Instance.

Pay a penalty for permission to continue to operate the Instance for a limited time to prepare for snapshot or termination.

Increase the maximum bid, with an optional maximum time that the bid is in force for each applicable Instance. This would permit the instance to complete any high value computations before shutting down. Various UI presented by the system accept user to input and manage requesting, allocation, and execution based on an increased maximum bid, and are configured to accept maximum duration for the increased bid (e.g., handling termination of resources with preservation operations as the maximum duration is impended)/

Apply any of the above approaches to one or more alternative instances. If, for example, the price for computing resources had increased enough that only some of Customer's instances might be killed, but not all, or the price had increased substantially on one Resource type but not all Resource types allocated by the Customer, then Provider might be willing to accept various Resources or bundles of Resources from the Customer instead of a particular Resource tied to a particular Instance. Permitting the Customer to designate the killed Instances would enhance the utility of the spot market considerably while still providing the Provider with the necessary resources to meet market demand. In one embodiment, an interface is provided that presents the above selections to the customer or program operated by the customer, and accepts input specifying an option for continued execution or information for selecting instances to kill.

In another embodiment, based on predicted determinations of probability of a spot kill, the system can be configured to notify the user via API or UI, and provide options to terminate resources, update bid price to avoid, snap shot, etc.

Customers May Manage their Own Spot Kills

In another embodiment, a Customer may bid a much higher price for Resources than it actually wishes to pay and closely monitor prices for its Resources. Once the prevailing price for its Resources exceeds a certain threshold, Customer may initiate its own "spot kill", giving the customer a higher level of control over the winding up of the killed Resources. In one example, Customer would implement an API with the Tasks running on its Resources that would receive instructions that a kill was impending and ensure that each Task had sufficient time to wind up by performing operations such as: checkpoint its computation, store any intermediate results, and notify Customer's API that it had completed its pre-termination operations.

In one embodiment, the customer API is configured to monitor active instances and current pricing being submitted (e.g., bid) to keep the resources executing. The customer API can be configured to alert the customer when a current (or predicted) price crosses a threshold. In one embodiment, the customer or program operated by the customer can then access a management UI that is configured to accept selection of instances to kill or instances to begin preparing for termination.

Price Quoting in Competitive Markets

Various aspects of the disclosure describe embodiments that include value for other Providers in addition to Customers of Resources. Various cloud resource Providers implement various embodiments to collect price information from the other providers to update their own prices in real time. For example, by monitoring competitors' spot prices for particular instances, a provider can quote a more accurate place in the marketplace to optimize a particular fitness function, such as offering the lowest price, offering a price 10% higher than the competition, or price matching.

In a simple example, Provider A is wishing to enter the market and compete against an established Provider B. A might monitor the prices quoted by Provider B in real time, and update its own prices to 95% of Provider B's published prices provided A has adequate computing demand to meet customer needs.

In another example, Customer may operate its own private cloud which offers a certain capacity of Resources, each of which is available at a specific marginal cost. Customer monitors prices quoted by all Providers and compares them to its own internal capacity and marginal costs, and executes its tasks on optimal Resources at any given time.

In another example, a Provider may monitor Resources available from multiple Providers and provide a collection of any or all of these Resources to Customers, allowing Customers to choose the optimal resources for its requirements.

In a final example, a Provider may monitor Resources available from multiple Providers (possibly including itself) and act as a Virtual Provider to Customers, wherein Customers would allocate Resources from the Virtual Provider, and the Virtual Provider would then allocate the optimal Resources for a task and provide Customers with a single interface for identifying and operating Resources and executing tasks. In this example, the Virtual Provider would be responsible for managing the appropriate Resources across its supported Providers. In a related example, the Virtual Provider's management of Resources may include checkpointing tasks and restarting tasks on other Resources when the previously allocated Resources for a task are no longer optimal.

Providers' Spot Price Management

Most spot markets only guarantee the price of a computing resource for a short, fixed window of time, for example, one hour. A Provider may also use some embodiments to predict and manage the Provider's own future spot prices, incorporating unique knowledge of supply, demand, electricity costs based on time of day and day of week, and even potential outages.

In one implementation, the Provider records as many dimensions of resource characteristics as it wishes into a time series database. The dimensions can include, for example, for each time interval: available supply, customer demand, price quotations provided, load on allocated instances, electricity costs, available network bandwidth, available storage bandwidth, customer bids, prevailing spot price, and more (in other examples any combination of the preceding dimensions (some, two, three dimensions, etc.) can be used). The Provider feeds this data into a machine learning algorithm or mathematical model (a "Spot Market Model") to predict the revenue for a particular set of Resources given similar variables. Using this model and analysis, the Provider generates time series predictions of each variable to infer the most likely spot prices in the future. For example, by creating a time series and model of demand, the Provider can predict future demand for a particular time and day, which when coupled with other predicted variables can yield a prediction of the prevailing spot price at that future time.

A provider could implement various embodiments to predict the best time to conduct maintenance operations based on any fitness function. To achieve this, the Provider would introduce a reduced supply into the Spot Market Model at various maintenance windows and choose the window that optimizes that fitness function. Although many Providers choose to conduct maintenance operations based on minimizing impact on Customers, a Provider might wish to this to optimize another value—like maximizing revenue.

Providers may also manipulate pricing of spot resources to optimize placement of virtual machines on hardware across racks, rows, data centers, or even other providers. For example, prices increases on loaded racks, data centers, etc., will lead to bidding on resources with lower prices at a desired location and/or resource. In another example, reducing price at a desired location can effectively operate to move resource allocations. In some embodiments, this can lead to better power utilization, where for example a provider may be able to power down a number of resources during periods of relatively low demand or for scheduled maintenance operations. For example, making certain resources expensive or unavailable on the spot market in one set of resources, and cheaper in another, could allow a provider to shift load to the latter set of resources.

Embodiments with Spot Price Guarantees

According to some embodiments, Providers who can better predict spot price movement can offer their Customers additional guarantees about spot prices to potentially increase revenues. Because a Provider has an information advantage over its Customers—a Provider has information on historical supply and demand, the state of its systems, which customers have started spot computations and what their bids are, etc.—a Provider can monetize this information advantage by offering their customers price guarantees for spot prices for short- to medium-term computations.

For example, a Provider might publish a spot price of $0.25 per hour for a Resource and be relatively certain that the Resource's spot price will not exceed $0.30 per hour in the next 12 hours. Customers do not know this with as much certainty as a Provider and may be willing to pay a premium to "lock in" a spot price for the expected length of their computation—a fair exchange for eliminating the risk of a spot kill Because the Provider has a better estimate of the risk of the spot kill than the Customer, the Provider is more likely to make more money from Customers than this process allowing Customers to pay even less.

Providers may also guarantee future spot prices to Customers who wish to perform a computation in the future because data required to perform the computation is not yet available, or because the expected price of Resources may be lower in the future. For example, a Customer may be collecting weekly operations statistics from various business units and assembling them into a data store for analysis. The Customer knows that this process won't be done until 2:00 am on Saturday morning, but wants to ensure that it is completed quickly once it is ready. The Customer might be willing to pay a premium to ensure that the resources it requires on Saturday morning will be available to it but desires a lower cost than the flat rate (guaranteed) published prices. Or, a Customer might not be particularly sensitive about the time a computation begins and decide to look at various spot prices over the next several hours and choose the lowest starting price. This would permit Providers to spread out computations over time and offer deep discounts to advance reservations of typically off-peak days and times. This is similar to the airline industry offering deeply discounted fares for Wednesday travel with 21-day advance purchase.

In one embodiment, instead of issuing a single spot price for an instance of Resource allocated for one hour beginning immediately, a Provider might issue the following table of spot prices for a particular Resource (TABLE V):

TABLE V

| Start Time | 1 Hour | 2 Hours | | 3 Hours | | |
|---|---|---|---|---|---|---|
| Hour | 1st | 1st | 2nd | 1st | 2nd | 3rd |
| 5:00 | $1.25 | $1.25 | $1.35 | $1.25 | $1.35 | $1.45 |
| 6:00 | $1.35 | $1.35 | $1.45 | $1.35 | $1.45 | $1.65 |
| 7:00 | $1.45 | $1.45 | $1.65 | $1.45 | $1.65 | $2.20 |
| 8:00 | $1.65 | $1.65 | $2.15 | $1.65 | $2.15 | $2.35 |
| 9:00 | $2.15 | $2.15 | $2.30 | $2.15 | $2.30 | $2.40 |
| 10:00 | $2.25 | $2.25 | $2.35 | $2.25 | $2.35 | $2.50 |

Note that in the example shown in Table V, the Provider need not charge the same price for each hour irrespective of the length of the reservation. For example, the hour from 7:00-8:00 am is $1.45 whether it is the first hour of a 1-hour reservation or the third hour of a 3-hour reservation, but the hour from 10:00-11:00 costs $2.25 for one hour, but more as the second hour of a 2-hour reservation ($2.30) or still more as the third of a 3-hour reservation ($2.35). The Provider is likely to be able to charge more money for longer reservations for at least two reasons. First, shorter reservations are easier to allocate on a dynamic platform than longer reservations and give the Provider greater flexibility. More importantly, the Customer has no way of guaranteeing that three one-hour reservations will be on the same Resource and part of the value of the reservation is that the continuity of the computation is preserved without a spot kill. Thus, the value to the Customer is not only in having the time reserved in advance, but also knowing that the Instance can run for the entire predicted length of the computation. The airplane metaphor works well here as well: people pay more for nonstop flights than flights with plane changes, even though they arrive at their destination either way. If the Provider does not wish to charge a premium for contiguous reservations, the pricing can be simplified significantly by publishing hourly prices and letting customers reserve contiguous hours of the same Resource.

Embodiments Using Spot Price Predictions and Guarantees to Optimize SaaS Costs

Because various embodiments of the system are configured to permit Provider and Customer to predict spot prices, a Provider or Customer who offers value-added services (e.g., automated testing or data analytics) on top of base Resources can optimize the provision of these resources based on predicted spot prices. For the purposes of clarity in this section, a provider of a SaaS service is referred to as a Provider and the consumer thereof as a Customer, although a Customer of a cloud computing Provider might also provide SaaS to its own customers.

Many Providers have SaaS offerings that are priced irrespective of computation costs. These Providers can reduce costs by using the various embodiments to optimize computation cost based on time and date. Referring to the above example in "Using Predicted Resource Prices and Availability to Allocate Resources", a Provider can allocate resources for the SaaS computations to lower costs.

In competitive markets, a Provider may use the same method to offer its customers lower costs while still making a reasonable profit. This permits Providers to pass on cost savings to its customers and likely offer more favorable pricing than its competitors who do not practice computation cost optimization. Some embodiments enable Providers to offer SaaS to Customers who wish to pay the lowest cost and provide their own fitness functions to the Providers. Then the Provider would simply add a license fee and/or markup to the computation cost, and perform the cost optimization for each Customer. By aggregating Customers together, the Provider may also be able to achieve greater efficiency by reallocating unused computation time to other Customers. For example, if billing is done hourly, and one customer only needs 15 minutes, the Provider could allocate the other 45 minutes to another customer and charge each for an hour or lower Provider's costs.

Many customers do not like variable pricing because they dislike unpredictable costs. A Provider can also use the invention to offer Customers various pricing options. For example, a Provider could offer Customers a "Gold" package that guarantees "on demand" computations, as well as a "Bronze" package that guarantees "next business morning" computations, with lower fixed costs. The Provider would then practice one or more aspects of the disclosure to optimize the costs of the computation over the given time. The Provider might also take advantage of unused resources allocated to serve Gold customers by allocating them to customers paying less.

Example of "First to Fill" Resource Allocation

Because many cloud providers permit canceling an order until the instance is provisioned, a Customer might place orders for two equivalent spot Resources from two Providers at the same time, and then cancel one of the orders depending on which order is filled first. Various embodiments implement one or more APIs that recognize Providers that permit canceling an order and automatically execute first to fill procedures.

Cloud Computing Resource Spot Market API

According to one embodiment, the system includes one or more (and any combination (e.g., combination of two, three, four, five, six, seven, eight, nine, or more of the API calls) of the following API calls for a customer to participate in a Provider's Spot Market for computing Resources:

Calls a Customer May Make to Provider

<[time0, price0], [time1, price1], . . . >=GetSpotPriceHistory(resource, start_time, end_time)—Obtain spot price history for a given resource.

<quote_id, quote_expiration, [time0, price0], [time1, price1], . . . >=GetSpotPriceQuote(resource, start_time=now( ), end_time=null)—Obtain spot price quotes for a given time period in the future (possibly starting now). Defaults to begin now and accept as long into the future as the Provider will quote guaranteed prices. A quote ID and expiration date are also provided with the results so that the Customer can use the quote to allocate resources at the quoted price.

<quote_id, quote_expiration, time, total_price>=GetCustomSpotQuote(job_desc, start_time=now( ), end_time=null)

Obtain a custom quote for a given compute job described by job_desc (possibly starting now). A quote ID and expiration date are also provided with the results so that the Customer can use the quote to allocate resources at the quoted price.

bid_unique_id=BidSpotPrice(resource, bid, start_time=now( ), end_time=null, length=null)

Returns a unique identifier after placing a bid for a particular resource.

The default time to start is as soon as possible (now).

The default is for the bid to be valid until canceled (end_time).

The default is for the bid to be for a computation of indeterminate length (length=null) where length may be a number of hours.

bid_unique_id=UpdateSpotBid(bid_unique_id, bid, start_time=now( ), end_time=null, length=null)

Updates a bid with the information as described above.

reservation_unique_id=AcceptCustomQuote(resource, quote_id, start_time=now( ))

Returns a unique identifier for a reservation after accepting a quote. It is an error if the start_time is later than the expiration of the quote provided in the quote call.

reservation_unique_id=ReserveSpotResource(resource, quote_id, bid=null, start_time=now( ), length=3600)

Returns a unique identifier after placing a reservation for a particular resource.

The quote_id must be supplied after obtaining a valid quotation; if it is not supplied (null) then bid must be supplied with a total price for the intended reservation.

The default time to start is as soon as possible (now).

The default is for the resource to be reserved for one hour (3600 seconds).

Provider will return a reservation ID if the reservation is successful or an error code if the reservation cannot be made (e.g. "QUOTE_EXPIRED", "BID_TOO_LOW", etc.)

confirmation=CancelSpotBid(bid_unique_id)

Attempts to cancel a spot bid already placed. Confirmation may include messages such as "CONFIRMED", "ERROR", or "ALREADY_ALLOCATED".

instance_status=SpotBidCheck(bid_unique_id)

Returns the status of an instance, e.g. "WAITING TO ALLOCATE", "RUNNING", "CANCELED", "COMPLETED", "KILLED"

Example Calls a Provider May Make to Customer

According to one embodiment, the system includes one or more (and any combination (e.g., combination of two, three, or more of the API calls) of the following API calls a Provider can make on the Customer:

<instance_id0, instance_id1 . . . >=ChooseSpotKillInstance(<resource0, resource1, . . . >)

Provider asks Customer to choose one instance to kill for each of the specified instances.

basket_=ChooseSpotKillBasket(<[basket0_instance0, basket0_instance1, . . . ], [basket1_instance0], [basket0_instance0, basket0_instance1, basket0_instance2, . . . ], . . . )

Provider asks Customer to choose a basket of instances to kill from a list of specified baskets of instances NotifySpotKill(delay_seconds, instance_id0, . . . )

Figure 10:
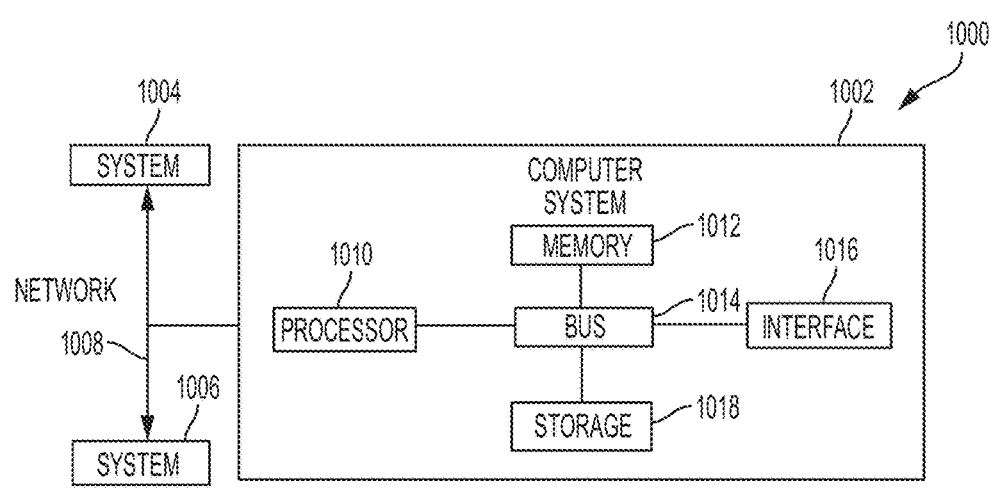
FIG. 10 is a block diagram of an example computer system according to one embodiment.

Notifies the Customer of an impending spot kill in delay_ seconds seconds for the provided instance_ids Referring now to FIG. 10, there is illustrated a block diagram of a special purpose distributed computer system 1000, in which various aspects and functions are practiced. As shown, the distributed computer system 1000 includes one or more special purpose computer systems that exchange information. More specifically, the distributed computer system 1000 includes specially configured computer systems 1002, 1004 and 1006. As shown, the computer systems 1002, 1004 and 1006 are interconnected by, and may exchange data through, a communication network 1008. For example, system engines, system components, subsystems, and/or modules can be implemented on 1002, which can communicate with other systems (1004-1006), which operate together to provide the functions and operations as discussed herein.

In some embodiments, the network 1008 may include any communication network through which computer systems may exchange data. To exchange data using the network 1008, the computer systems 1002, 1004 and 1006 and the network 1008 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SSB, JSON, SOAP, CORBA, REST and Web Services. To ensure data transfer is secure, the computer systems 1002, 1004 and 1006 may transmit data via the network 1008 using a variety of security measures including, for example, TLS, SSL or VPN. While the distributed computer system 1000 illustrates three networked computer systems, the distributed computer system 1000 is not so limited and may include any number of computer systems and computing devices, networked using any medium and communication protocol.

As illustrated in FIG. 10, the computer system 1002 includes at least one processor 1010, a memory 1012, a bus 1014, an interface 1016 and data storage 1018. To implement at least some of the aspects, functions and processes disclosed herein, the processor 1010 performs a series of instructions that result in manipulated data. The processor 1010 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 1010 is connected to other system components, including one or more memory devices 1012, by the bus 1014.

The memory 1012 stores programs and data during operation of the computer system 1002. Thus, the memory 1012 may be a relatively high performance, volatile, random access memory such as a dynamic random access memory (DRAM) or static memory (SRAM). However, the memory 1012 may include any device for storing data, such as a disk drive or other non-volatile storage device. Various examples may organize the memory 1012 into particularized and, in some cases, unique structures to perform the functions disclosed herein. These data structures may be sized and organized to store values for particular data and types of data.

Elements of the computer system 1002 are coupled by an interconnection element such as the bus 1014. The bus 1014 may include one or more physical busses, for example, busses between components that are integrated within the same machine, but may include any communication coupling between system elements including specialized or standard computing bus technologies such as IDE, SCSI, PCI and InfiniBand. The bus 1014 enables communications, such as data and instructions, to be exchanged between system components of the computer system 1002.

The computer system 1002 also includes one or more interface devices 1016 such as input devices, output devices and combination input/output devices. Interface devices may receive input or provide output. More particularly, output devices may render information for external presentation. Input devices may accept information from external sources. Examples of interface devices include keyboards, mouse devices, trackpads, microphones, touch screens, printing devices, display screens, speakers, network interface cards, etc. Interface devices allow the computer system 1002 to exchange information and to communicate with external entities, such as users and other systems.

The data storage 1018 includes a computer readable and writeable nonvolatile, or non-transitory, data storage medium in which instructions are stored that define a program or other object that is executed by the processor 1010. The data storage 1018 also may include information that is recorded, on or in, the medium, and that is processed by the processor 1010 during execution of the program. More specifically, the information may be stored in one or more data structures specifically configured to conserve storage space or increase data exchange performance.

The instructions stored in the data storage may be persistently stored as encoded signals, and the instructions may cause the processor 1010 to perform any of the functions described herein. The medium may be, for example, optical disk, magnetic disk or flash memory, among other options. In operation, the processor 1010 or some other controller causes data to be read from the nonvolatile recording medium into another memory, such as the memory 1012, that allows for faster access to the information by the processor 1010 than does the storage medium included in the data storage 1018. The memory may be located in the data storage 1018 or in the memory 1012; however, the processor 1010 manipulates the data within the memory, and then copies the data to the storage medium associated with the data storage 1018 after processing is completed. A variety of components may manage data movement between the storage medium and other memory elements and examples are not limited to particular data management components. Further, examples are not limited to a particular memory system or data storage system.

Although the computer system 1002 is shown by way of example as one type of computer system upon which various aspects and functions may be practiced, aspects and functions are not limited to being implemented on the computer system 1002 as shown in FIG. 10. Various aspects and functions may be practiced on one or more computers having different architectures or components from those shown in FIG. 10. For instance, the computer system 1002 may include specially programmed, special-purpose hardware, such as an application-specific integrated circuit (ASIC) tailored to perform a particular operation disclosed herein, while another example may perform the same function using a grid of several specially configured computing devices running MAC OS System X with Motorola PowerPC processors and several specialized computing devices running proprietary hardware and operating systems.

The computer system 1002 may be a computer system including an operating system that manages at least a portion of the hardware elements included in the computer system 1002. In some examples, a processor or controller, such as the processor 1010, executes an operating system. Examples of a particular operating system that may be executed include a Windows-based operating system, such as Windows NT, Windows 2000 (Windows ME), Windows XP, Windows Vista, or Windows 7 or 8, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and examples are not limited to any particular operating system.

The processor 1010 and operating system together define a computer platform for which application programs in high-level programming languages are written. These component applications may be executable, intermediate, byte-code or interpreted code that communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Objective C, or Javascript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or data objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one embodiment of this invention, it is to be appreciated various alterations, modifications, and improvements will readily occur to those skilled in the art. Such alterations, modifica- tions, and improvements are intended to be part of this disclosure, and are intended to be within the scope of the invention. Accordingly, the foregoing description and drawings are by way of example only.

What is claimed is:

1. A system for managing cloud compute resources, the system comprising:
at least one processor operatively connected to a memory, the at least one processor when executing configured to:
analyze historical time series of cloud compute resource ("resource") characteristics, including at least cost and availability of the cloud compute resources, for one or more resource types from one or more cloud compute providers ("providers");
model future resource characteristics for executing subsequent tasks responsive to analysis of the historical time series data;
predict one or more resource characteristics including at least resource availability over a future time duration at the one or more cloud compute providers required for executing a submitted compute task based on the model;
allocate terminable cloud compute resources to the submitted compute task and trigger execution of the submitted compute task;
at least one application program interface (API) configured to:
monitor resource characteristics of the terminable cloud compute resources and for the one or more resource types assigned to execute the submitted compute task from the one or more cloud compute providers;
update during the execution period predictions for one or more resource characteristics for remaining portions of the future time duration; and
update the historical time series of resource characteristics data with the monitored resource characteristics and update the model, including associated predictions of the one or more resource characteristics for determining re-allocation of execution resources of the compute task at one or more of the cloud compute providers; and
wherein the at least one processor is further configured to schedule or trigger execution of preservation operations in response to a likelihood of termination of the terminable resources exceeding a threshold value.

2. The system of claim 1, wherein the at least one processor is further configured to:
predict a likelihood of a spot kill which includes deallocation of a provisioned resource based at least in part on the predicted resource characteristics; and
update the prediction on the likelihood of the spot kill based on the updated predictions for the resource characteristics from the one or more providers.

3. The system of claim 1, wherein the terminable resources includes a spot instance.

4. The system of claim 1, wherein the at least one processor is further configured to:
monitor real-time characteristics of resources running compute tasks;
evaluate whether the characteristics are not optimal;
schedule execution of preservation operations; and
terminate resources with suboptimal characteristics once preservation operations have completed.

5. The system of claim 4, wherein the at least one processor is further configured to:

determine the characteristics are not optimal based on modeling execution characteristics across one or more cloud compute providers and identifying better performance characteristics at the current cloud compute provider or the one or more cloud compute providers.

6. The system of claim 1, wherein the at least one processor is further configured to:
schedule execution of recovery operations in response to a task termination being predicted.

7. The system of claim 6, wherein the at least one processor is further configured to:
receive and store one or more intermediate results of submitted compute tasks; and
provide the one or more intermediate results to a restarted task during execution of recovery operations for a task terminated.

8. The system of claim 1, wherein the at least one processor is further configured to: predict availability characteristics for resources over the future time duration for executing the submitted compute task based on predicting availability characteristics for resources based on historical, projected or inferred cost characteristics associated with the resources.

9. The system of claim 1, wherein the at least one processor is further configured to: predict availability characteristics for resources over the future time duration, based on predicted utilization of available resources from on historical, projected or inferred utilization of the one or more provider's resources.

10. The system of claim 9, wherein the at least one processor is further configured to: determine a utilization model based on the projected or inferred utilization to achieve at least one optimization goal from a group comprising: maximize revenue, minimize costs, maximize resource utilization, minimize spot kills, minimize time to completion, and minimize power consumption.

11. A method for managing cloud compute resources, the method comprising:
analyzing historical time series of cloud compute resource ("resource") characteristics, including at least cost and availability, for one or more resource types from one or more cloud compute providers by at least one application program interface (API);
model future resource characteristics for executing subsequent tasks responsive to analysis of the historical time series data;
predicting, by a computer system, one or more resource characteristics over a future time duration the one or more resource characteristics define parameters for executing a submitted compute task at the one or more cloud compute providers;
allocate terminable cloud compute resources to the submitted compute task and trigger execution of the submitted compute task;
monitoring, by at least one API, resource characteristics for the one or more resource types from the one or more cloud compute providers during execution of the submitted compute task;
updating, by the at least one API, during an execution period predictions for one or more resource characteristics for remaining portions of the future time duration responsive to analysis the monitored resource characteristics; and
updating, by the at least one API, the historical time series of resource characteristics data with the monitored resource characteristics and update the model including associated predictions of the one or more resource characteristics for determining re-allocation of execution resources of the compute task at one or more of the cloud compute providers; and
wherein the method further comprises scheduling or triggering execution of preservation operations in response to a likelihood of termination of the terminable resources exceeding a threshold value.

12. The method of claim 11, further comprising an act of predicting, by a computer system, a likelihood of a spot kill which includes deallocation of a provisioned resource based at least in part on the predicted resource characteristics; and
updating, by the computer system, the prediction on the likelihood of the spot kill based on the updated predictions for the resource characteristics from the one or more providers.

13. The method of claim 11, further comprising the acts of:
monitoring, by the computer system, real-time characteristics of resources running compute tasks;
evaluating whether the characteristics are not optimal;
scheduling, by the computer system, execution of preservation operations; and
proactively terminating resources with suboptimal characteristics once preservation operations have completed.

14. The method of claim 13, wherein evaluating the characteristics are not optimal includes modeling execution characteristics across a plurality of other cloud compute providers and identifying better performance characteristics at the current cloud compute provider or the plurality of other cloud compute providers.

15. The method of claim 11, further comprising an act of scheduling, by the computer system, execution of recovery operations in response to a task termination being predicted.

16. The method of claim 15, further comprising:
receiving and storing, by the computer system, one or more intermediate results of submitted compute tasks; and
providing, by the computer system, the one or more intermediate results to a restarted task during execution of recovery operations for a task terminated.

17. The method of claim 11, wherein the act of predicting, by the computer system, availability characteristics for resources over the future time duration for executing the submitted compute task, includes an act of predicting availability characteristics for resources based on historical, projected or inferred cost characteristics associated with the resources.

18. The method of claim 11, wherein the act of predicting, by the computer system, availability characteristics for resources over the future time duration, includes an act of predicting utilization of available resources based on historical, projected or inferred utilization of the one or more provider's resources.

19. The method of claim 18, further comprising an act of determining a utilization model based on the projected or inferred utilization to achieve at least one optimization goal from a group comprising: maximize revenue, minimize costs, maximize resource utilization, minimize spot kills, minimize time to completion, and minimize power consumption.

* * * * *